(12) United States Patent
Folsom et al.

(10) Patent No.: US 6,569,049 B1
(45) Date of Patent: May 27, 2003

(54) RADIAL PISTON HYDROMECHANICAL CONTINUOUSLY VARIABLE TRANSMISSION

(75) Inventors: Lawrence R. Folsom, Castleton, NY (US); Clive Tucker, Castleton, NY (US); Shaun M. O'Boyle, Castleton, NY (US)

(73) Assignee: Folsom Technologies, Inc., Castleton, NY (US)

( * ) Notice: Subject to any disclaimer, the term of this patent is extended or adjusted under 35 U.S.C. 154(b) by 0 days.

(21) Appl. No.: 10/039,944

(22) Filed: Oct. 26, 2001

Related U.S. Application Data

(60) Provisional application No. 60/243,956, filed on Oct. 26, 2000.

(51) Int. Cl.[7] ............................................. F16H 47/04
(52) U.S. Cl. ...................................................... 475/72
(58) Field of Search .................... 475/72, 83; 74/730.1; 474/198, 72

(56) References Cited

U.S. PATENT DOCUMENTS

| | | | | |
|---|---|---|---|---|
| 4,341,132 A | * | 7/1982 | Burdick ........................ | 475/72 |
| 4,704,923 A | * | 11/1987 | Taylor .......................... | 475/73 |
| 4,943,268 A | * | 7/1990 | Eisenmann et al. ........... | 475/95 |
| 4,994,002 A | * | 2/1991 | Valotto et al. ................. | 475/72 |
| 5,820,505 A | * | 10/1998 | Parker .......................... | 475/72 |
| 5,971,880 A | * | 10/1999 | Keiser .......................... | 475/83 |
| 5,997,426 A | * | 12/1999 | Ito et al. ....................... | 475/72 |

* cited by examiner

*Primary Examiner*—Saul Rodriqguez
*Assistant Examiner*—Ankur Parekh
(74) *Attorney, Agent, or Firm*—J. Michael Neary

(57) ABSTRACT

A continuously variable power transmission has a fixed mounting plinth, by which the transmission is mounted to a fixed structure, and an output shaft, to which an output device can be connected. A pintle having a flat radial slab and an axial arbor supports a radial piston pump rotor an one end of the arbor and a radial piston motor rotor on the other end of the arbor. A driven pulley surrounds the transmission and constitutes its exterior shell within which working fluid is contained. The pulley is coupled to a ring gear of a planetary gear set having a planet carrier with planet gears engaged between the ring gear and a sun gear. The sun gear is coupled to and drives the pump rotor, and the carrier is coupled to the output shaft. Working fluid pressurized by the pump is conveyed to the motor rotor to generate torque in the motor which is carried back to the planet carrier.

5 Claims, 35 Drawing Sheets

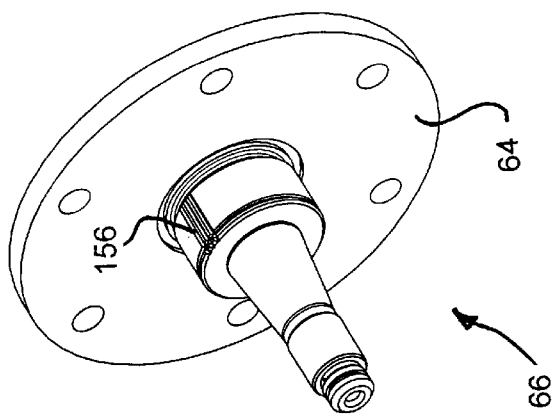
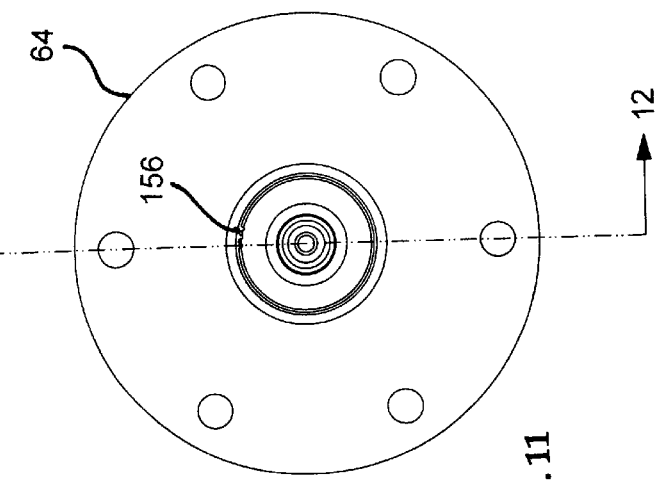
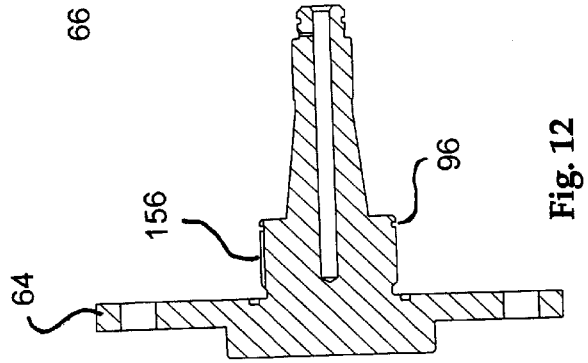

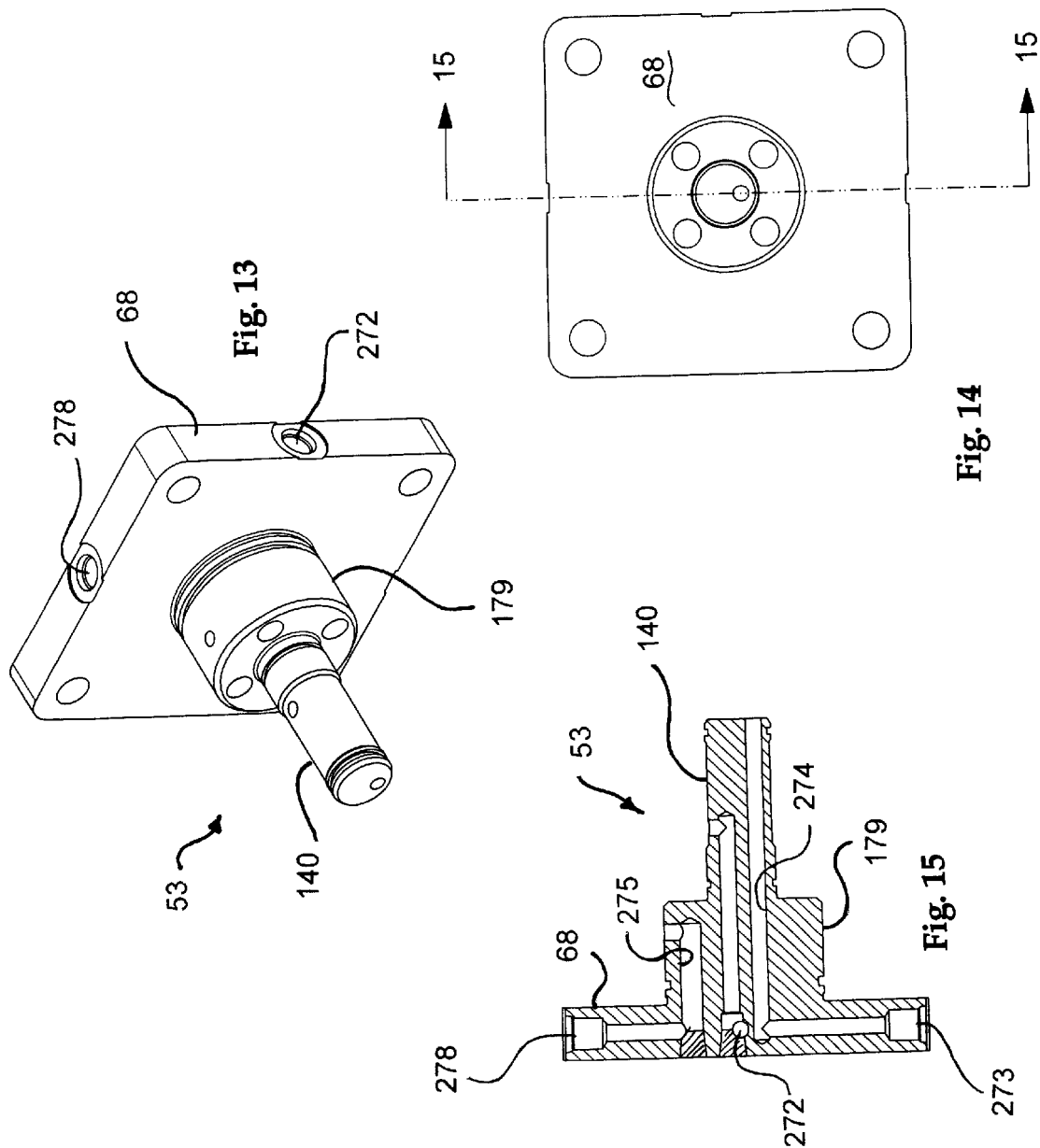

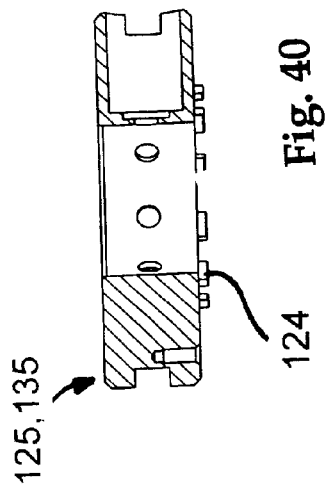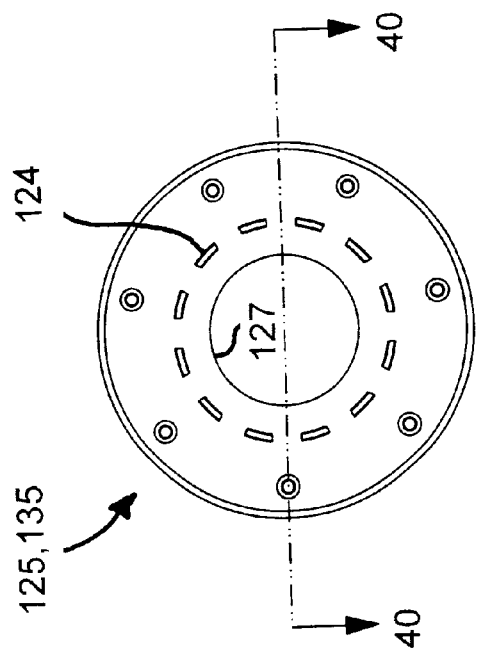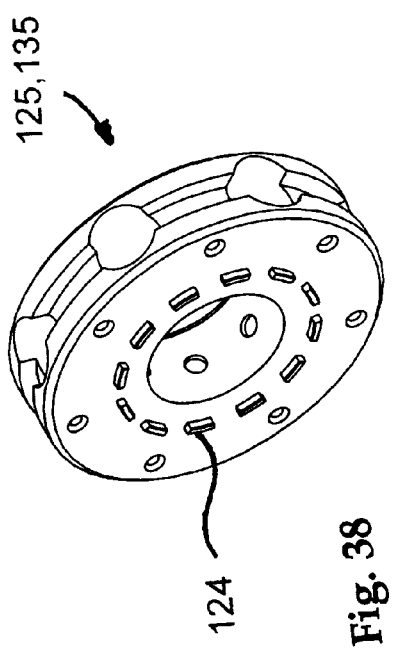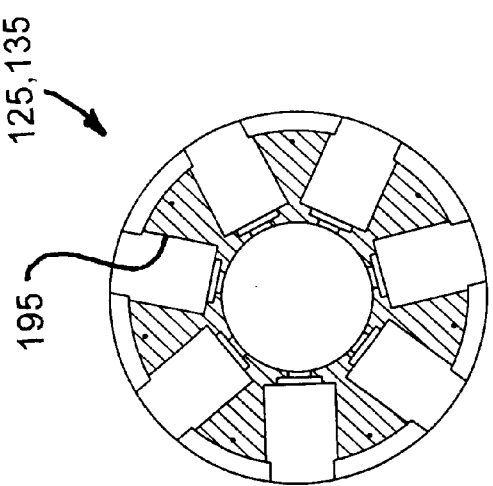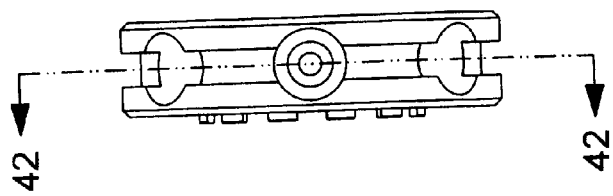

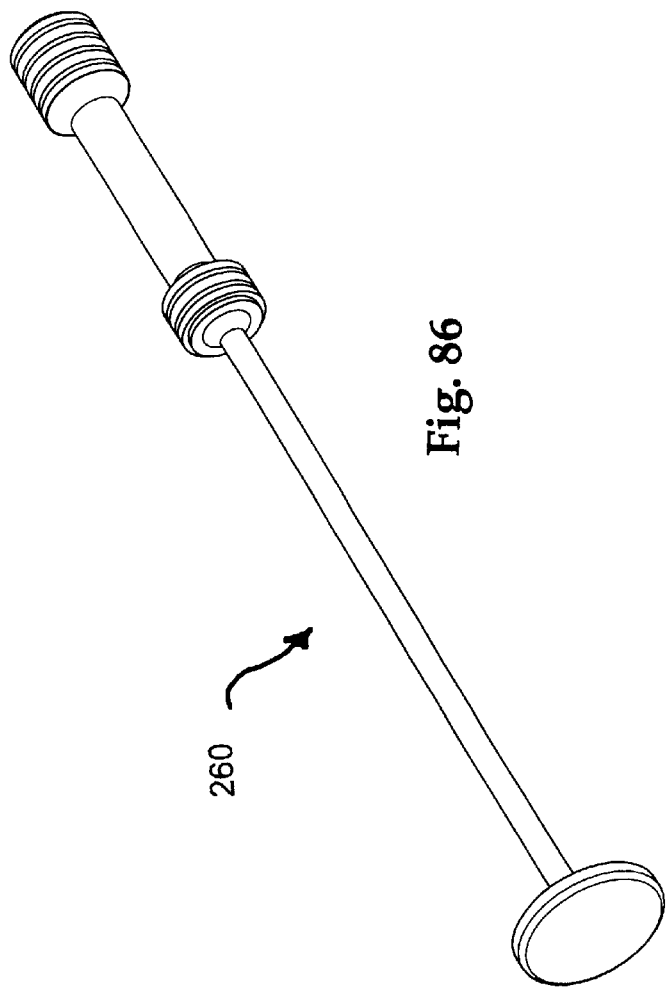
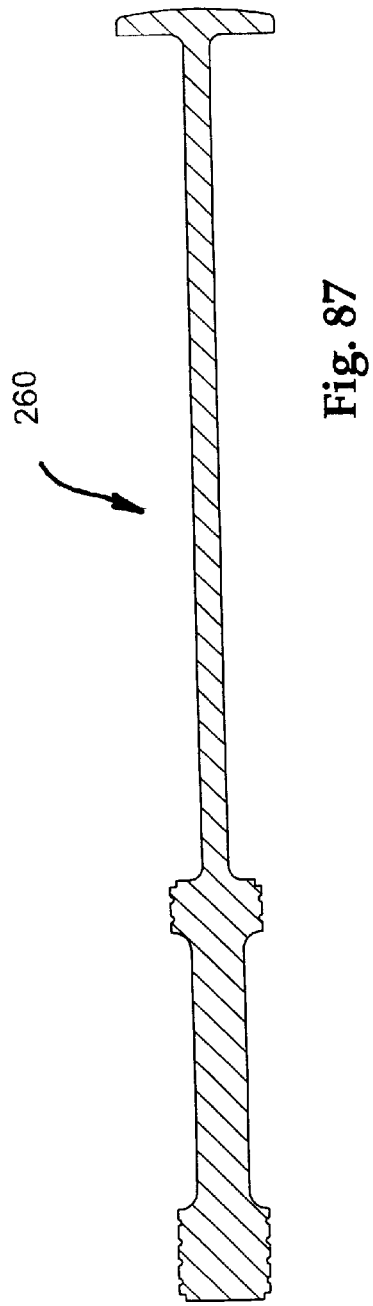

RADIAL PISTON HYDROMECHANICAL CONTINUOUSLY VARIABLE TRANSMISSION

This relates to U.S. Provisional Application 60/243,956 filed on Oct. 26, 2000. This invention relates to continuously variable power drive transmissions, and more particularly to an economical radial ball piston hydromechanical continuously variable drive transmission.

BACKGROUND OF THE INVENTION

Continuously variable hydrostatic power transmissions have been available for many years and are in use in applications in which their noise and inefficiency have not been seriously objectionable, such as lawn and garden tractors. However, such noise and inefficiency have recently become unacceptable in lawn and garden equipment, and there are numerous other applications for economical low and medium power continuously variable transmissions that require efficient and quiet operation.

SUMMARY OF THE INVENTION

This invention provides an economical continuously variable power transmission that is efficient and quiet.

The continuously variable power transmission according to this invention includes a fixed support plinth at one end by which the transmission is mounted to a fixed support structure, and an output shaft at the other end. A pintle having a flat radial slab and an axial arbor is bolted to the pinth and supports a radial piston pump rotor on one end of the arbor and a radial piston motor rotor on the other end of the arbor. Cylindrical cam rings are mounted around the pump and motor rotors to engage piston balls in the pump and motor rotor cylinders for pumping and torque generation. A driven pulley, having a drive surface engaged with a driving element for coupling rotating mechanical power to the transmission, surrounds the transmission and constitutes its exterior shell within which working fluid such as oil is contained. The driven pulley is supported for rotation on bearings at its two ends. At the support end, the pulley is supported on the plinth, and at the other end is supported on a fixed housing attached to the plinth. The output end of the driven pulley is coupled to a ring gear of a planetary gear set having a planet carrier with planet gears engaged between the ring gear and a sun gear. The sun gear is coupled to and drives the radial piston pump rotor, and the planet carrier is coupled to the output shaft, so the reaction torque from the torque applied to the pump rotor is applied directly to the output shaft. Working fluid pressurized by rotation of the pump is conveyed through channels in the pintle arbor to the motor rotor to pressurize the motor cylinders and generated torque in the motor which is carried via a motor drum back to the planet carrier and thence to the output shaft. The transmission ratio is set by adjusting the radial position of the cam rings which are mounted on a pivot pin at the lower end of the pintle slab and are tilted to the desired radial positions by action of a control system having actuator pistons mounted in upper part of the pintle slab. The cam rings may be coupled together at the top, opposite the pivot pin, by a lever rod mounted for swiveling in the top of the pintle slab, so tilting of the motor cam ring in one direction causes the lever rod to swivel about its swivel mounting in the pintle and tilt the pump cam ring in the opposite direction.

DESCRIPTION OF THE DRAWINGS

FIG. 10 is a perspective view of the output shaft shown in FIG. 4;

FIG. 11 is an end elevation of the output shaft shown in FIG. 10;

FIG. 12 is a sectional elevation along lines 12—12 in FIG. 11;

FIG. 13 is a perspective view of the support plinth shown in FIG. 4;

FIG. 14 is an end elevation of the support plinth shown in FIG. 13;

FIG. 15 is a sectional elevation of the support plinth along lines 15—15 in FIG. 14;

FIG. 38 is a perspective view of the rotor used in both the pump and motor shown in FIG. 4;

FIG. 39 is an end elevation of the rotor shown in FIG. 38;

FIG. 40 is sectional plan view of the rotor along lines 40—40 in FIG. 39;

FIG. 41 is a side elevation of the rotor shown in FIG. 38;

FIG. 42 is a sectional elevation along lines 42—42 in FIG. 41;

FIG. 86 is a perspective view of the control spool shown in FIGS. 8 and 9;

FIG. 87 is a sectional view on a section plane intersecting and parallel to the axis of the control spool shown in FIG. 86;

DESCRIPTION OF THE PREFERRED EMBODIMENT

Figure 1:
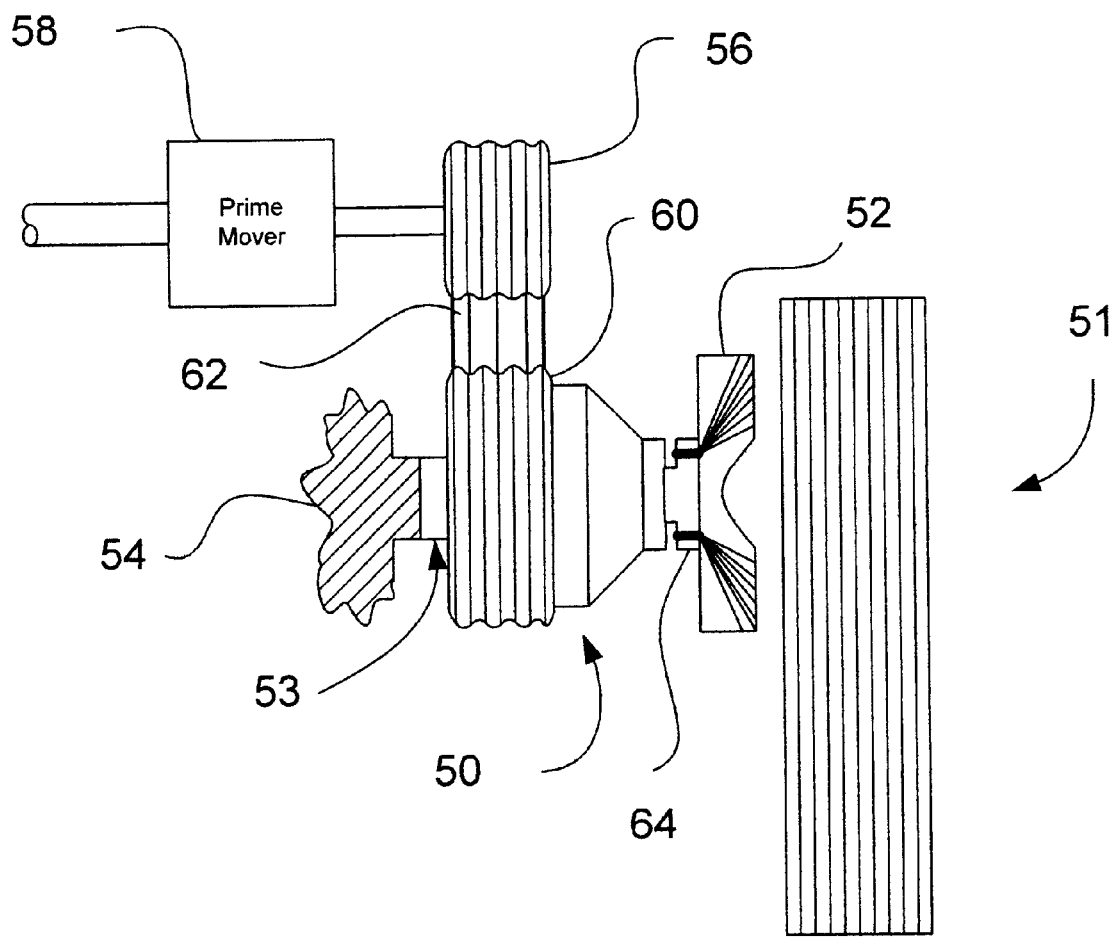
FIG. 1 is a schematic diagram of an engine compartment of a vehicle in which a transmission in accordance with this invention issued as a demand fan drive.

Turning now to the drawings, and more particularly to FIG. 1 thereof, a continuously variable transmission 50 is shown in a schematic layout of a vehicle engine compartment. The transmission 50 is used in this application as a demand fan drive unit for driving a cooling fan 52 behind the vehicle engine coolant radiator 51 for drawing cooling air through the radiator. The transmission 50 includes a support plinth 53 by which the transmission 50 is mounted at a support end of the transmission on a fixed support 54 in the engine compartment in a position that aligns an input pulley 56, driven by the vehicle prime mover 58, with a driven pulley 60 surrounding the transmission 50 concentrically. A drive belt 62, trained around the input pulley 56 and the driven pulley 60, transmits mechanical power in the form of torque at the rotation speed of the input pulley 56 to the driven pulley 56. The transmission 50 converts that mechanical power to rotation of the fan 52 at the desired speed, as set by the adjustable controls, described in detail below. The drive belt 62 could be replaced with a drive chain or a gear train for this or other applications of this transmission, such as a drive transmission for a small automobile such as a city car, or a lawn and garden tractor, between the prime mover and the drive wheels.

Figure 3:
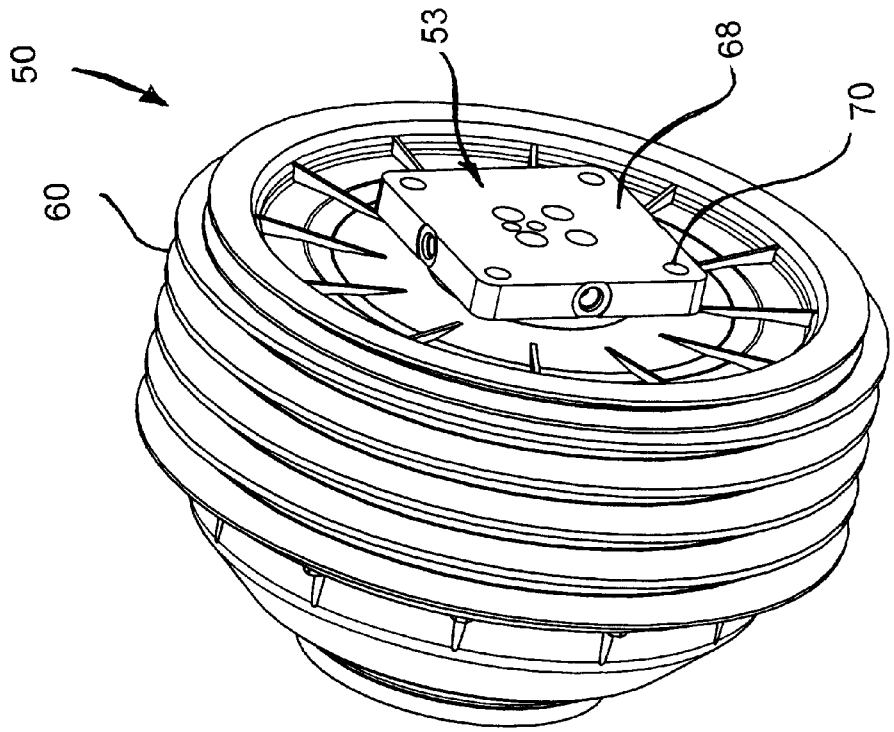
FIG. 3 is a perspective view of the transmission shown in FIG. 2, viewed from the support connection end.
Figure 2:
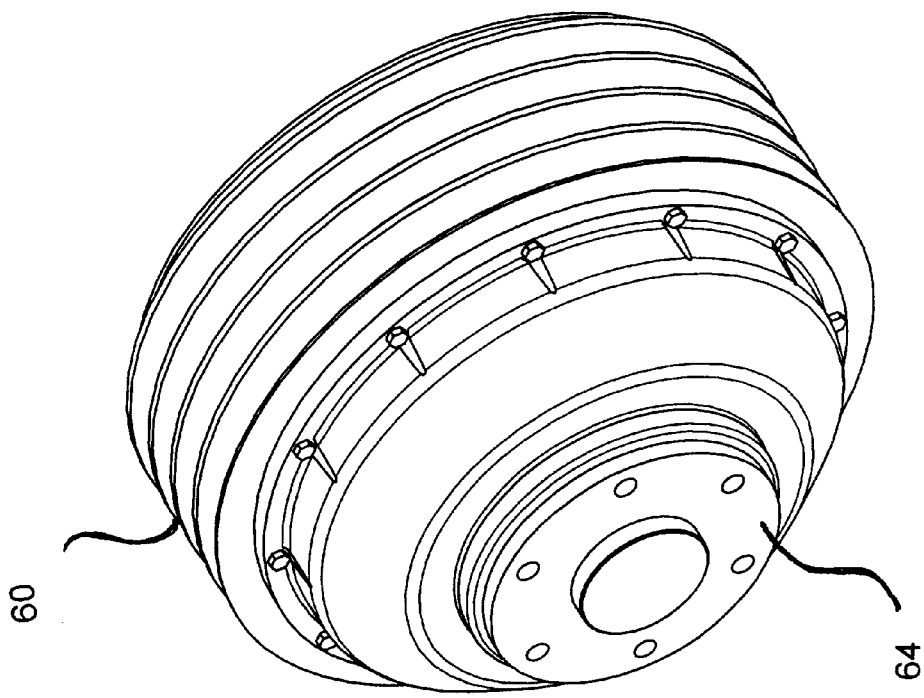
FIG. 2 is a perspective view of the transmission shown in FIG. 1, detached from the fan and the support mount in the engine compartment and viewed from the fan connection end.

Turning now to FIGS. 2 and 3, the output end of the transmission 50 is shown having a fan connection flange 64 by which the fan 52, or other driven load as noted above, is connected to and driven by the transmission 50. The fan connection flange 64 is integral with an output shaft 66, shown in FIG. 4 and shown in detail in FIGS. 10–12 and described in detail below. The support plinth 53, shown in FIGS. 3 and 4, and shown in detail in FIGS. 13–15 and described in detail below, has a square base plate 68 with four holes 70 by which the transmission is attached to the fixed support 54 in the engine compartment.

Figure 4:
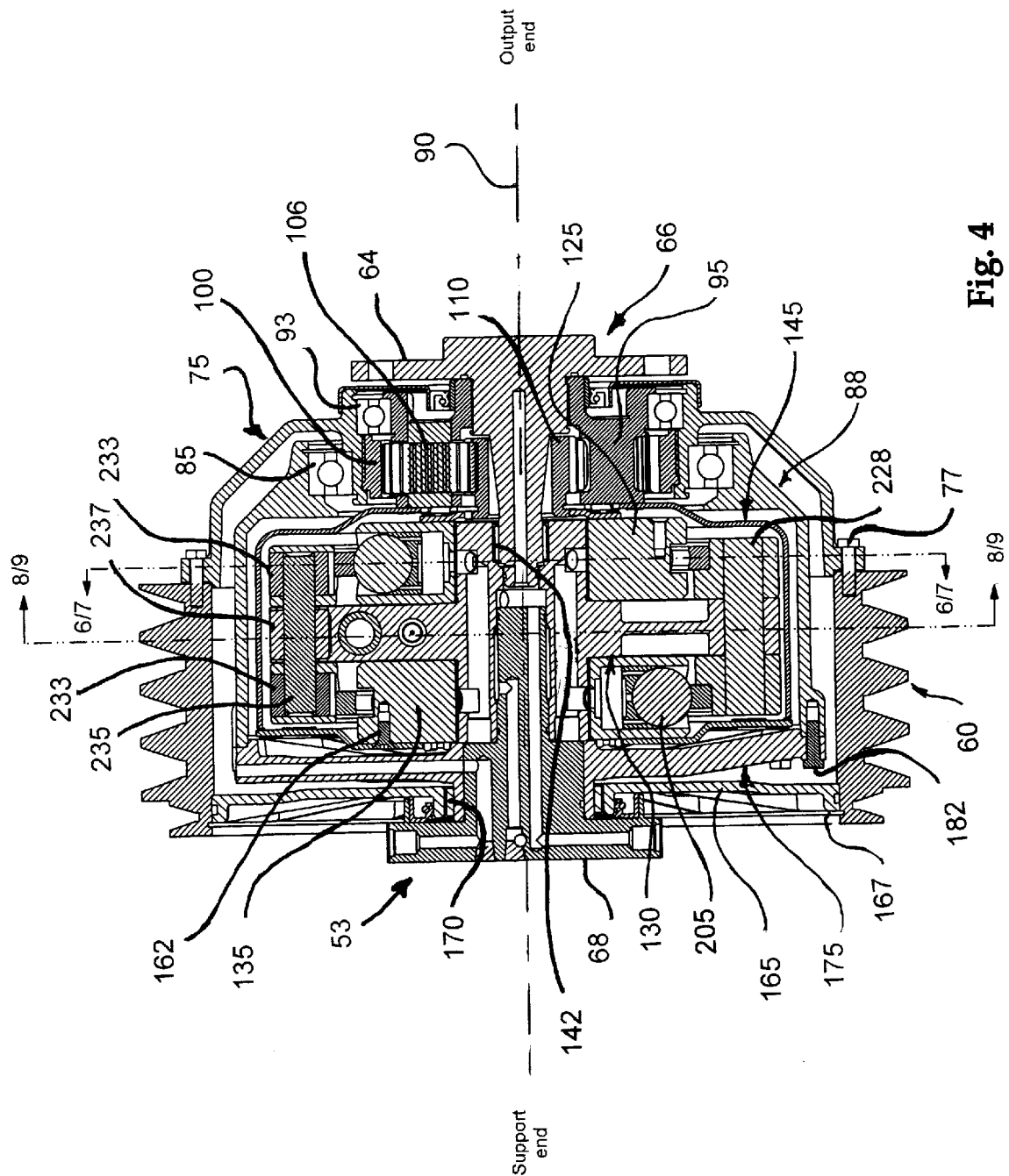
FIGS. 4 and 5 are sectional elevations along lines 4—4 and 5—5 in FIGS. 7 and 6, respectively, through the axial centerline of the transmission.
Figure 5:
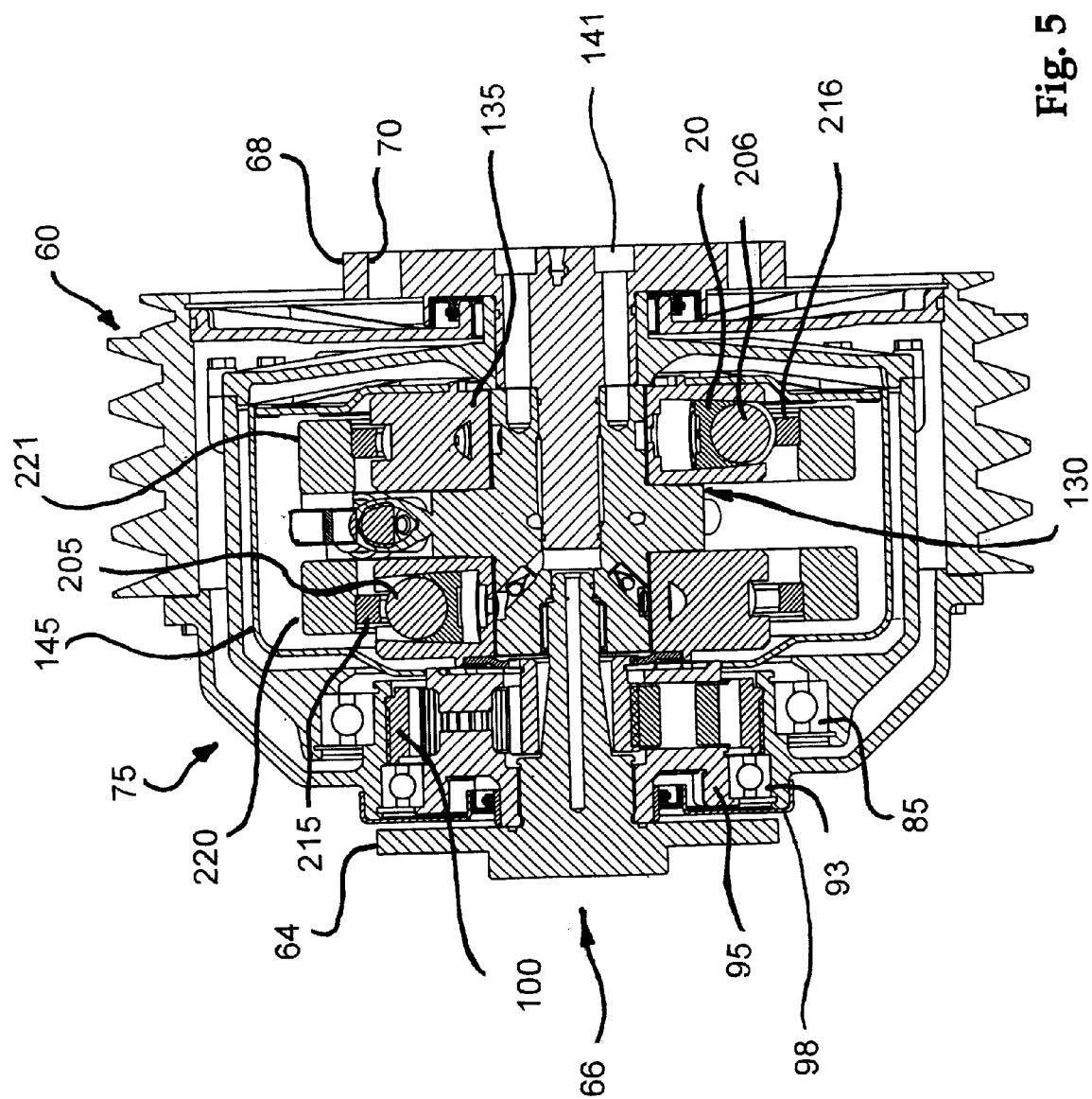
Figure 16:
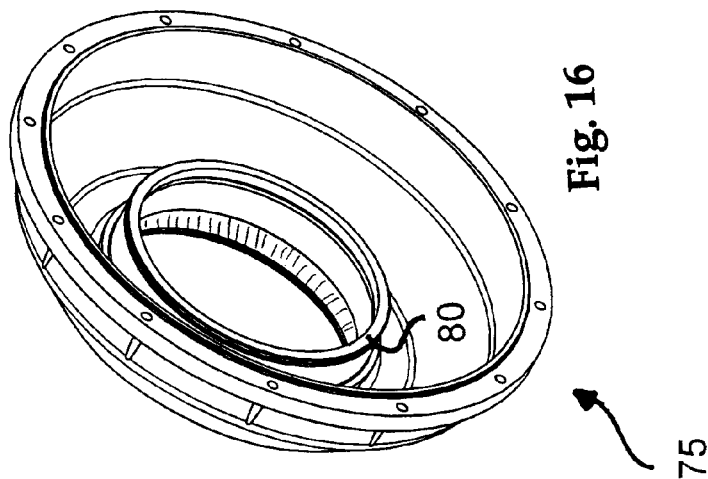
FIG. 16 is a perspective view of the pulley flange shown in FIG. 4.
Figure 17:
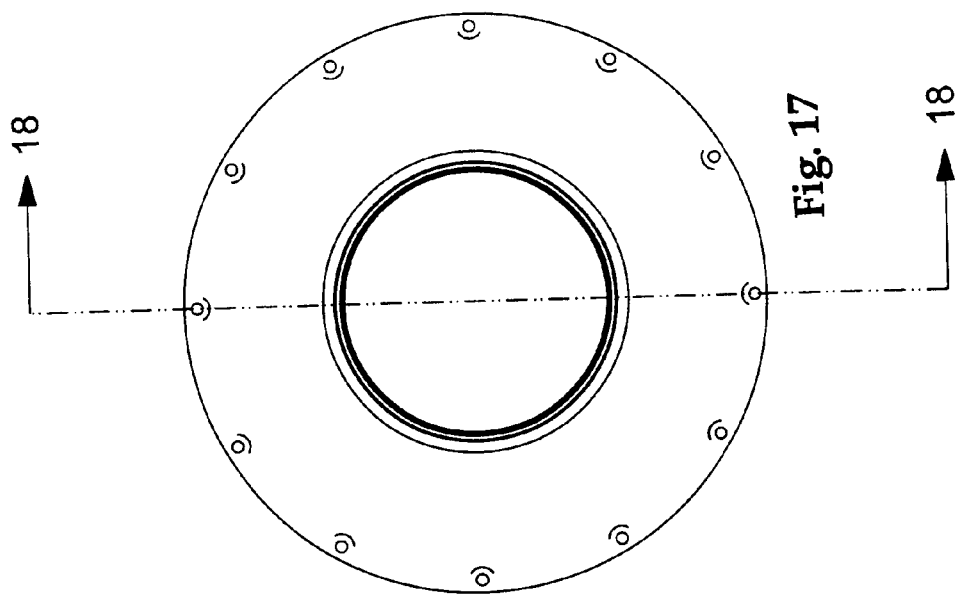
FIG. 17 is an end elevation of the pulley flange shown in FIG. 16.
Figure 18:
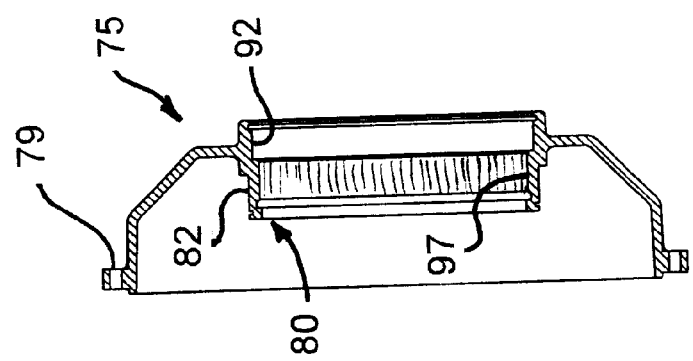
FIG. 18 is a sectional elevation of the pulley flange along lines 18—18 in FIG. 17.
Figure 19:
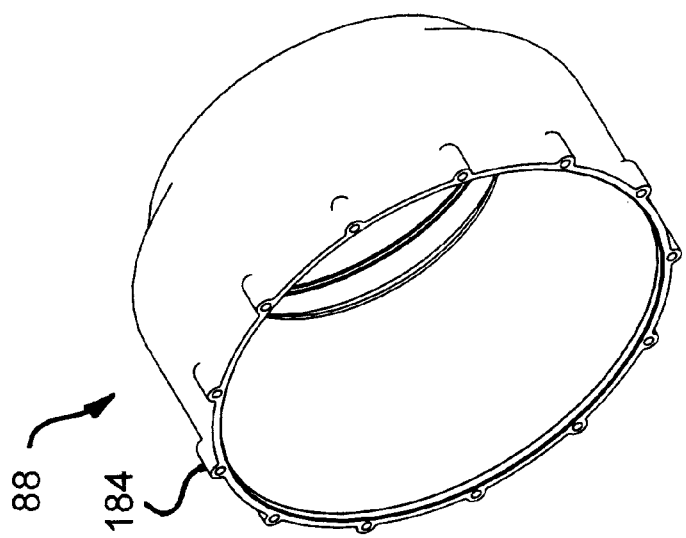
FIG. 19 is a perspective view of the fixed housing shown in FIG. 4.
Figure 20:
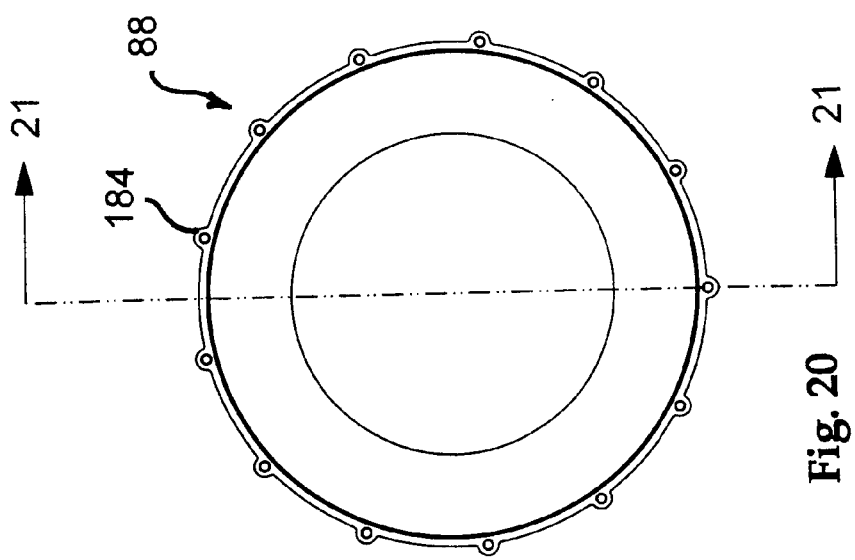
FIG. 20 is an end elevation of the fixed housing shown in FIG. 19.
Figure 21:
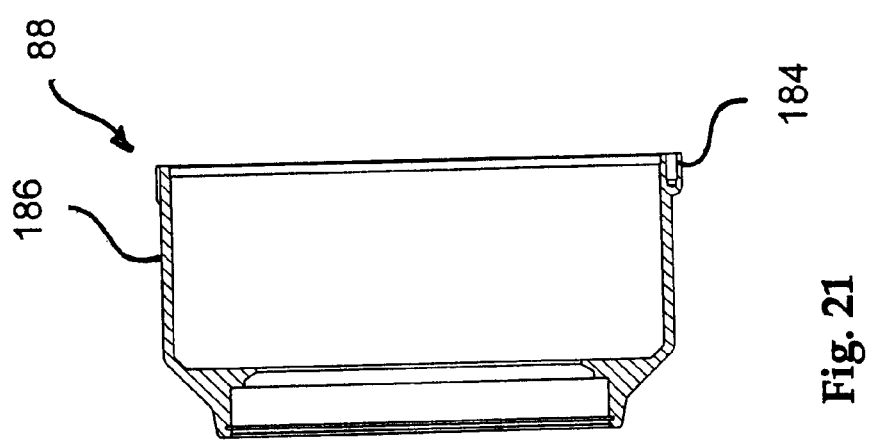
FIG. 21 is a sectional elevation of the fixed housing along lines 21—21 in FIG. 20.
Figure 22:
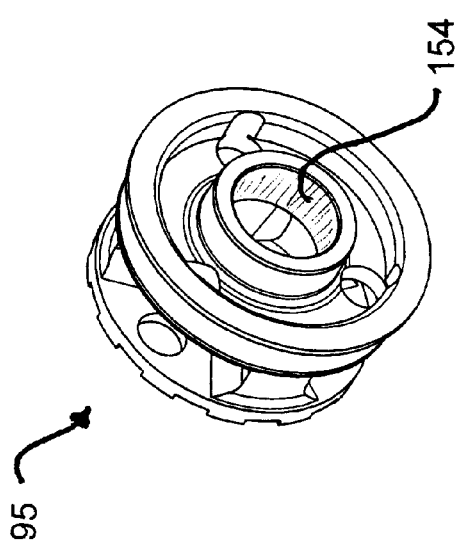
FIG. 22 is a perspective view of the planet carrier shown in FIG. 4, viewed from the output end.

As shown in FIGS. 4 and 5, the driven pulley 60 is connected to a bell-shaped pulley flange 75, shown in detail in FIGS. 16–18, by machine screws 77 extending through peripheral holes 79 in the outside peripheral edge of the pulley flange 75 and threaded into tapped holes in the edge of the driven pulley 60. The inside peripheral edge of the pulley flange 75 ends in an integral inner axial collar 80 having a radially outside cylindrical surface 82 that may be machined or ground to receive with a snug fit an inner bearing 85. The bearing 85 supports the pulley flange 75 on a fixed housing 88, shown in detail in FIGS. 19–21, for rotation about the central axis 90 of the transmission 50. The collar 80 of the pulley flange 75 also has a radially inside cylindrical surface 92, that likewise may be machined or ground to receive with a snug fit an outer bearing 93. The outer bearing 93 supports a planet carrier 95, shown in detail in FIGS. 22–25 and described in detail below. The planet carrier is connected to a splined section 156 of the output shaft 66 and the output shaft is held in place against axial translation by a snap ring (not shown) in a snap ring groove 96 on the splined section 156 inside the planet carrier 95. Another way to hole the output shaft against axial translation is to attach an oil seal cup 98 to the collar 80 of the pulley flange.

Figure 26:
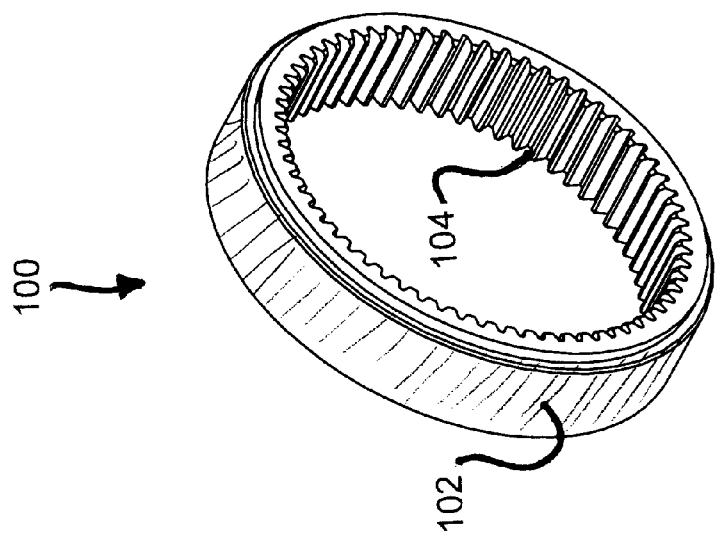
FIG. 26 is a perspective view of the ring gear for the planetary gear set shown in FIG. 4.
Figure 27:
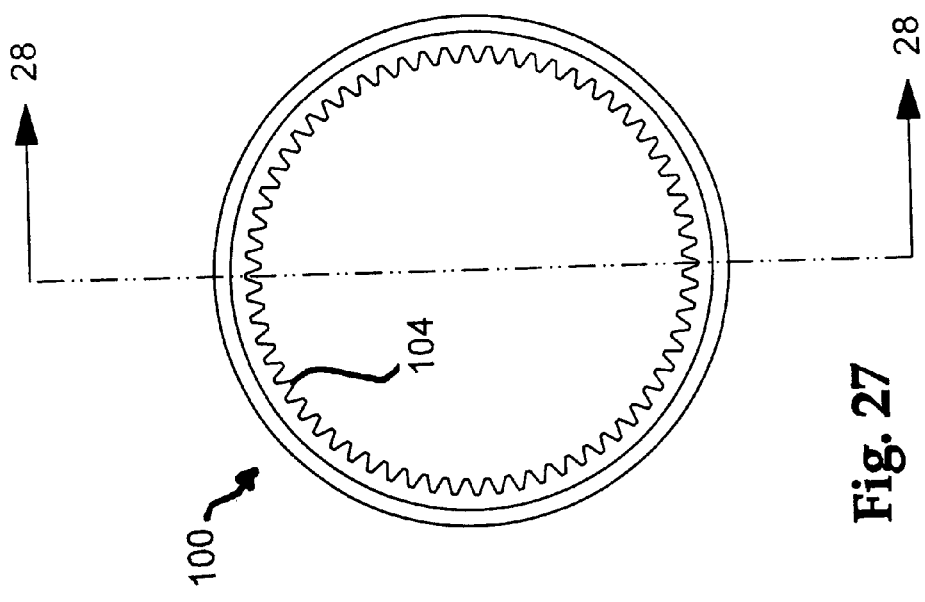
FIG. 27 is an end elevation of the ring gear shown in FIG. 26.
Figure 28:
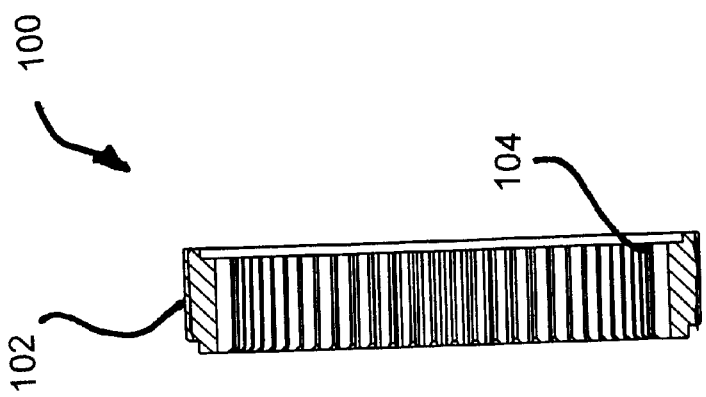
FIG. 28 is a sectional elevation of the ring gear along lines 28—28 in FIG. 27.
Figure 29:
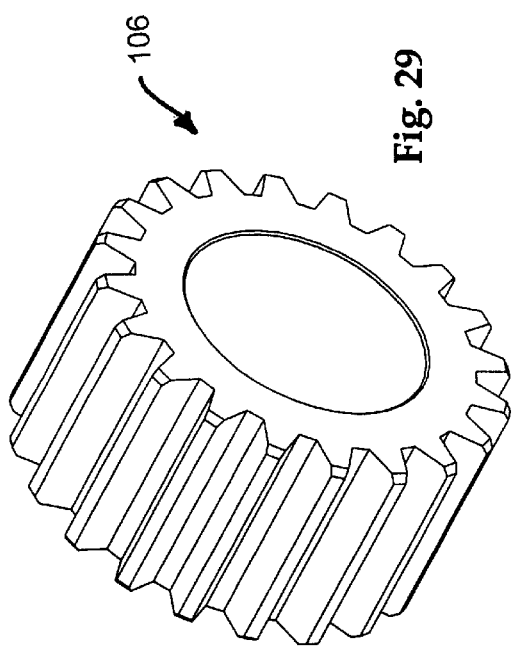
FIG. 29 is a perspective view of one of the planet gears which are mounted in the planet carrier shown in FIG. 22 an used in the planetary gear set shown in FIG. 4.
Figure 30:
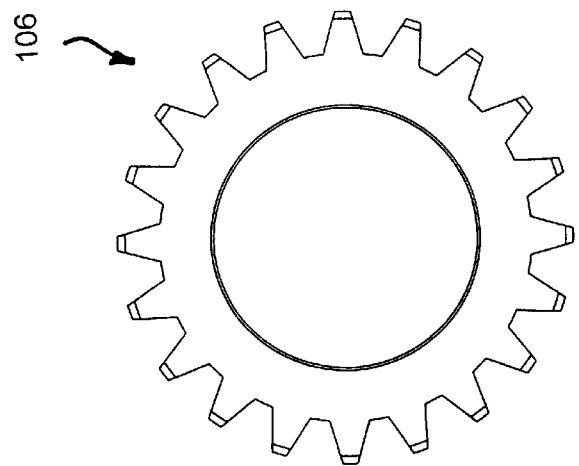
FIG. 30 is an end elevation of the planet gear shown in FIG. 29.
Figure 31:
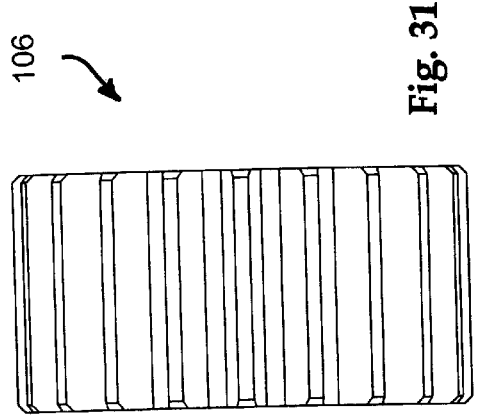
FIG. 31 is a side elevation of the planet gear shown in FIG. 29.
Figure 32:
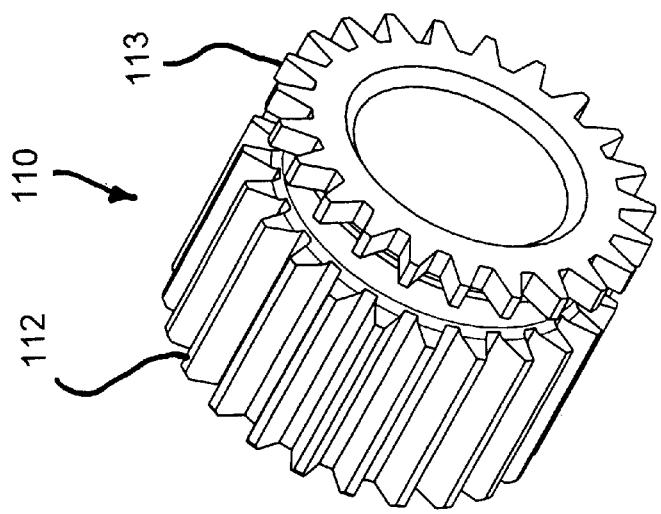
FIG. 32 is a perspective view of the sun gear of the planetary gear set shown in FIG. 4.
Figure 33:
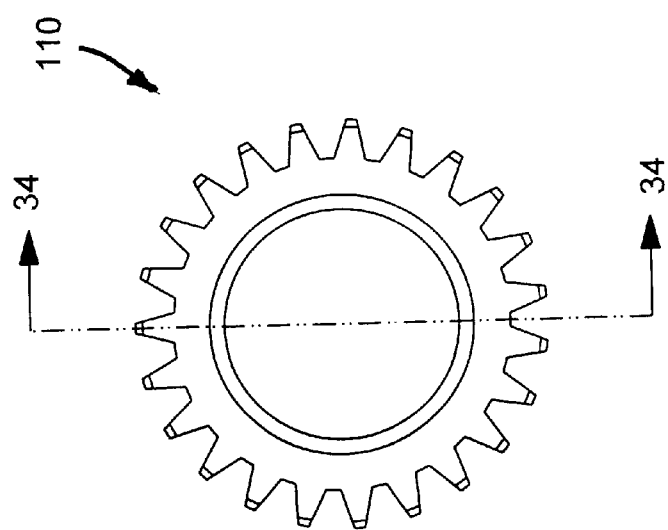
FIG. 33 is an end elevation of the sun gear shown in FIG. 32.
Figure 34:
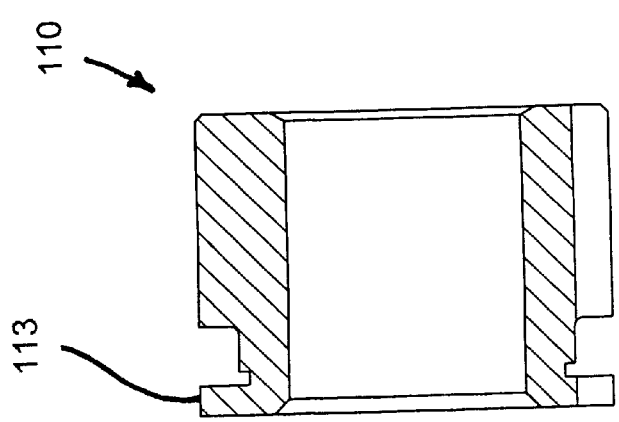
FIG. 34 is a sectional elevation of the sun gear along lines 34—34 in FIG. 32.

The collar 80 of the pulley flange 75 has a radially inside cylindrical surface 97 that is axially adjacent and inside the surface 92. The inside cylindrical surface 97 of the collar is splined and receives a ring gear 100, shown in detail in FIGS. 26–28, that is splined on its radially exterior surface 102 for torsional coupling to the pulley flange 75, and is provided with gear teeth on its radially inside surface 104 for engaging a series of planet gears 106, shown in FIGS. 29–31, mounted in the planet carrier 95. The planet gears 106 are engaged between the ring gear 100 and a sun gear 110, shown in FIGS. 32–34.

Figure 35:
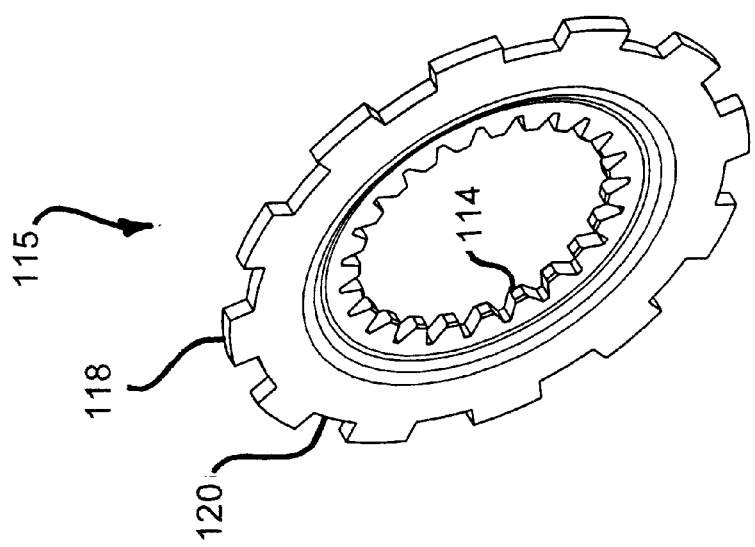
FIG. 35 is a perspective elevation of the pump drive ring shown in FIGS. 4 and 43.
Figure 36:
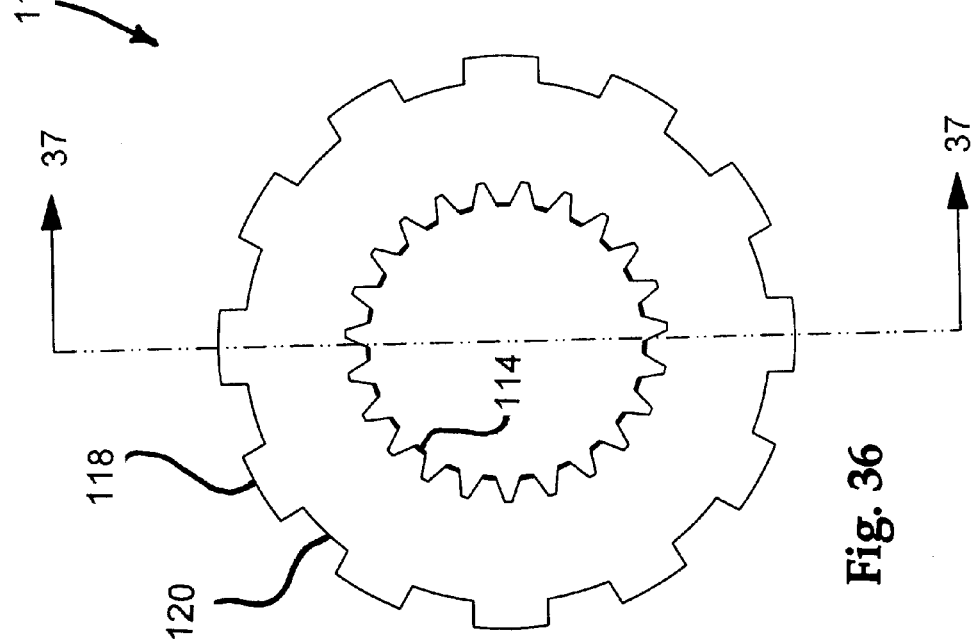
FIG. 36 is an end elevation of the pump drive ring shown in FIG. 35.
Figure 37:
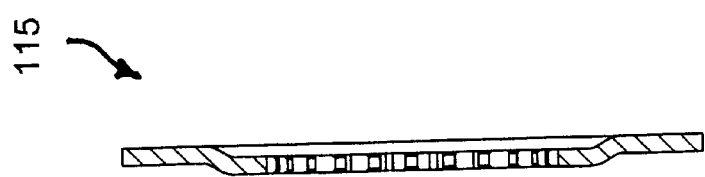
FIG. 37 is a sectional elevation of the pump drive ring along lines 37—37 in FIG. 36.
Figure 43:
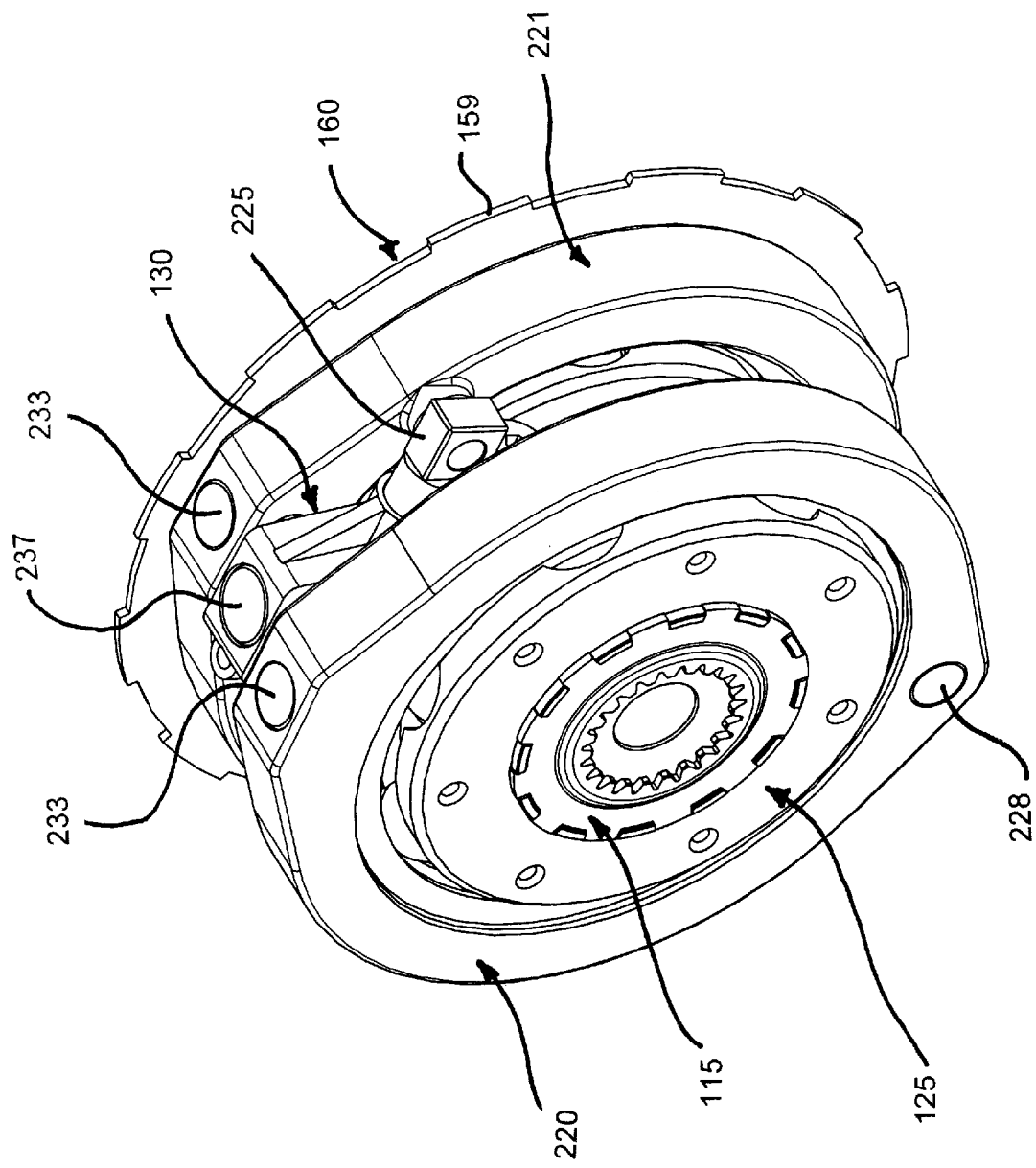
FIG. 43 is a perspective view of the pump and motor assembly shown in FIG. 4.
Figure 44:
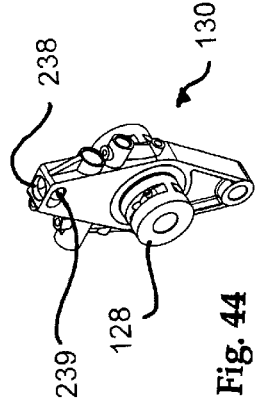
FIG. 44 is a perspective view of the pintle shown in FIG. 4, viewed from the output end.
Figure 45:
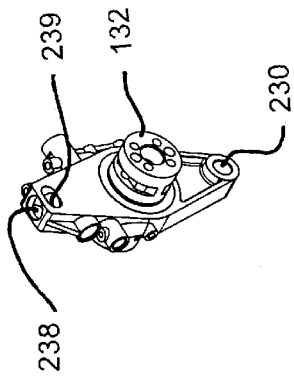
FIG. 45 is a perspective view of the pintle shown in FIG. 44, viewed from the input end.
Figure 51:
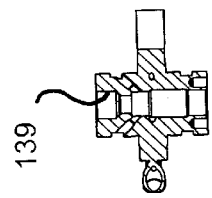
FIG. 51 is a sectional view on a diagonal section along lines 51—51 in FIG. 46.
Figure 48:
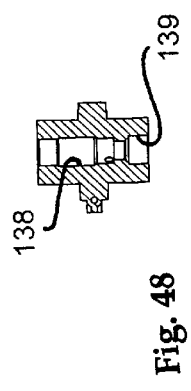
FIG. 48 is a sectional plan view of the pintle along lines 48—48 in FIG. 46.
Figure 46:
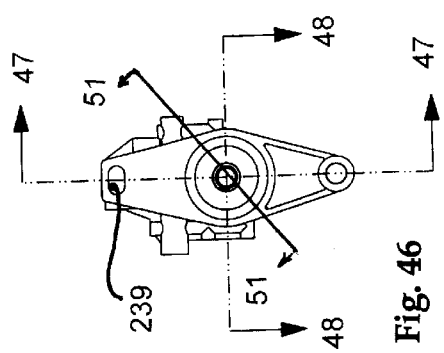
FIG. 46 is an elevation of the pintle shown in FIG. 44.
Figure 49:
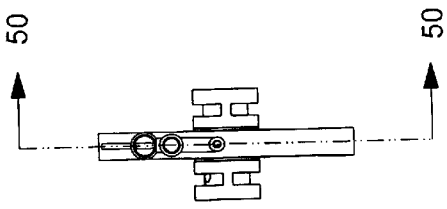
FIG. 49 is an end elevation of the pintle as viewed from the right in FIG. 46.
Figure 47:
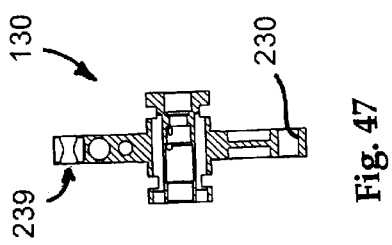
FIG. 47 is a sectional side elevation of the pintle along lines 47—47 in FIG. 46.
Figure 50:
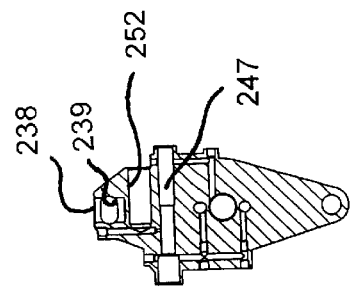
FIG. 50 is a sectional end elevation of the pintle along lines 50—50 in FIG. 49.

The sun gear 110 has an exterior surface provided with the usual gear teeth 112 and an inner ring 113 with exterior splines that are engaged with matching splines 114 around the inner periphery of a pump drive ring 115, shown in detail in FIGS. 35–37. The pump drive ring 115 has radially extending teeth 118 on its outside periphery that define slots 120 between the teeth 118. The slots 120 receive cogs 124 on the side of a pump rotor 125, shown in detail in FIGS. 38–42, and shown assembled with the pump drive ring 115 in FIG. 43, by which the pump rotor is driven in rotation about the axis 90 by the sun gear 110 by way of the pump drive ring 115.

The pump rotor 125 has an axial bore 127, which receives a pump rotor arbor 128 of a pintle 130, shown in detail in FIGS. 44–51. The opposite side of the pintle 130 also has an axial arbor 132 which is received into the axial bore of a motor rotor 135, also shown in detail in FIGS. 38–42 since the pump rotor 125 and the motor rotor 135 are identical. The pinde 130 has a stepped axial bore 138 by which the pintle is fixedly mounted concentric with the axis 90 on a stub shaft 140 projecting axially from the support plinth 53, as shown in FIGS. 4, 5, 13 and 15. The pintle is attached to the plinth 68 by bolts (not shown) in aligned bolt holes 141, as shown in FIG. 5. The other end 139 of the stepped bore 138 receives the inner end of the output shaft 66 and supports and stabilizes the inner end of the output shaft on needle bearings 142.

Figure 23:
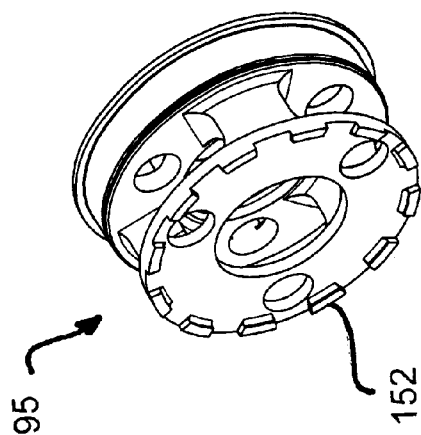
FIG. 23 is a perspective view of the planet carrier shown in FIG. 22, viewed from the other end.
Figure 24:
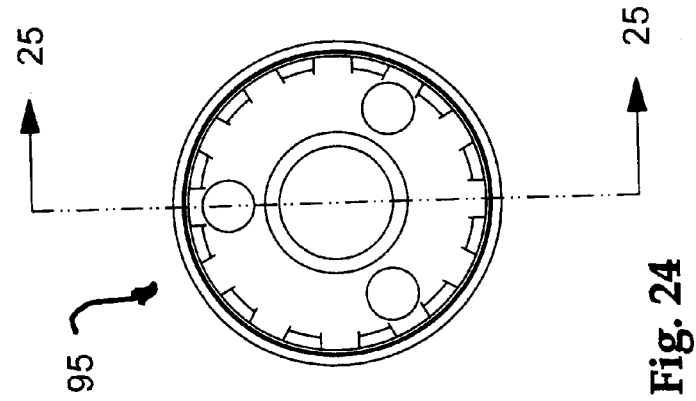
FIG. 24 is an end elevation of the planet carrier in FIG. 23.
Figure 25:
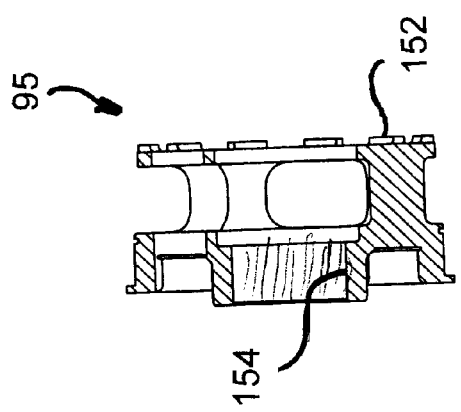
FIG. 25 is a sectional elevation of the planet carrier along lines 25—25 in FIG. 24.
Figure 52:
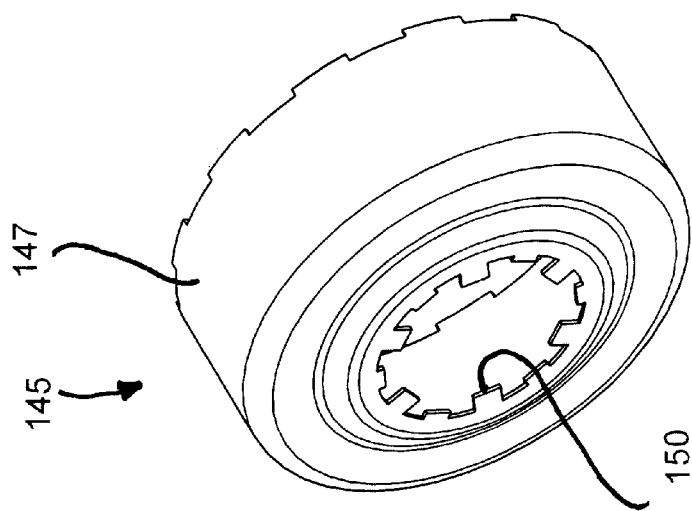
FIG. 52 is a perspective view of the motor drum shown in FIG. 4, as viewed form the output end.
Figure 53:
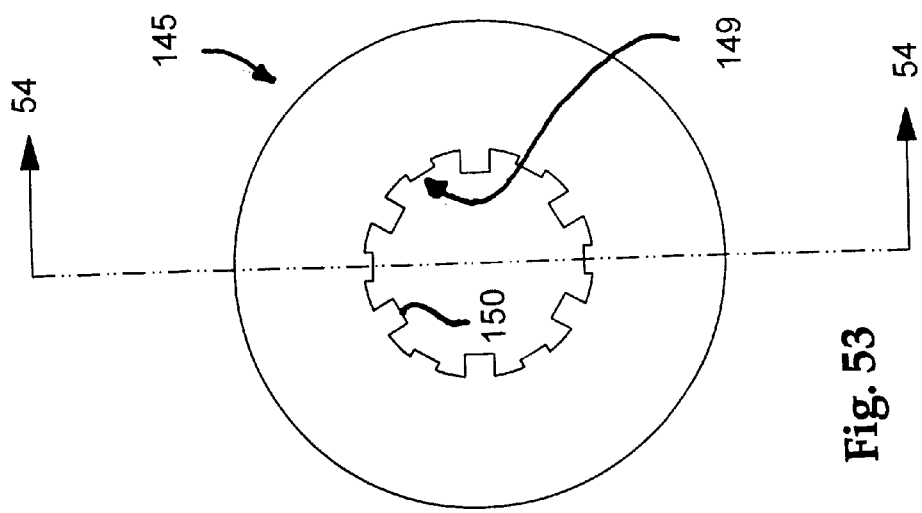
FIG. 53 is an end elevation of the motor drum shown in FIG. 52.
Figure 54:
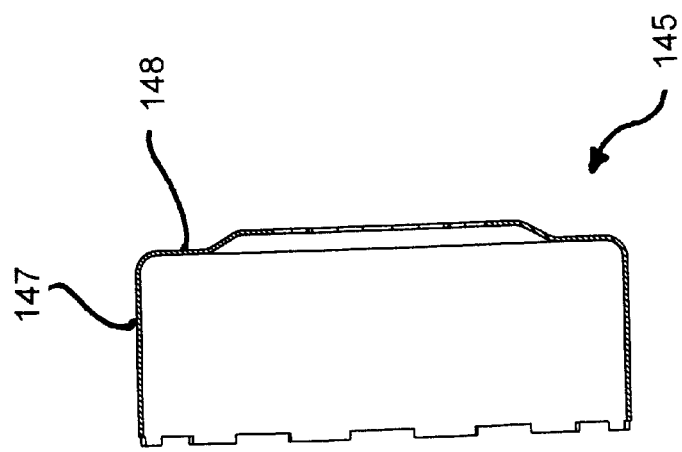
FIG. 54 is a sectional side elevation of the motor drum along lines 54—54 in FIG. 53.
Figure 55:
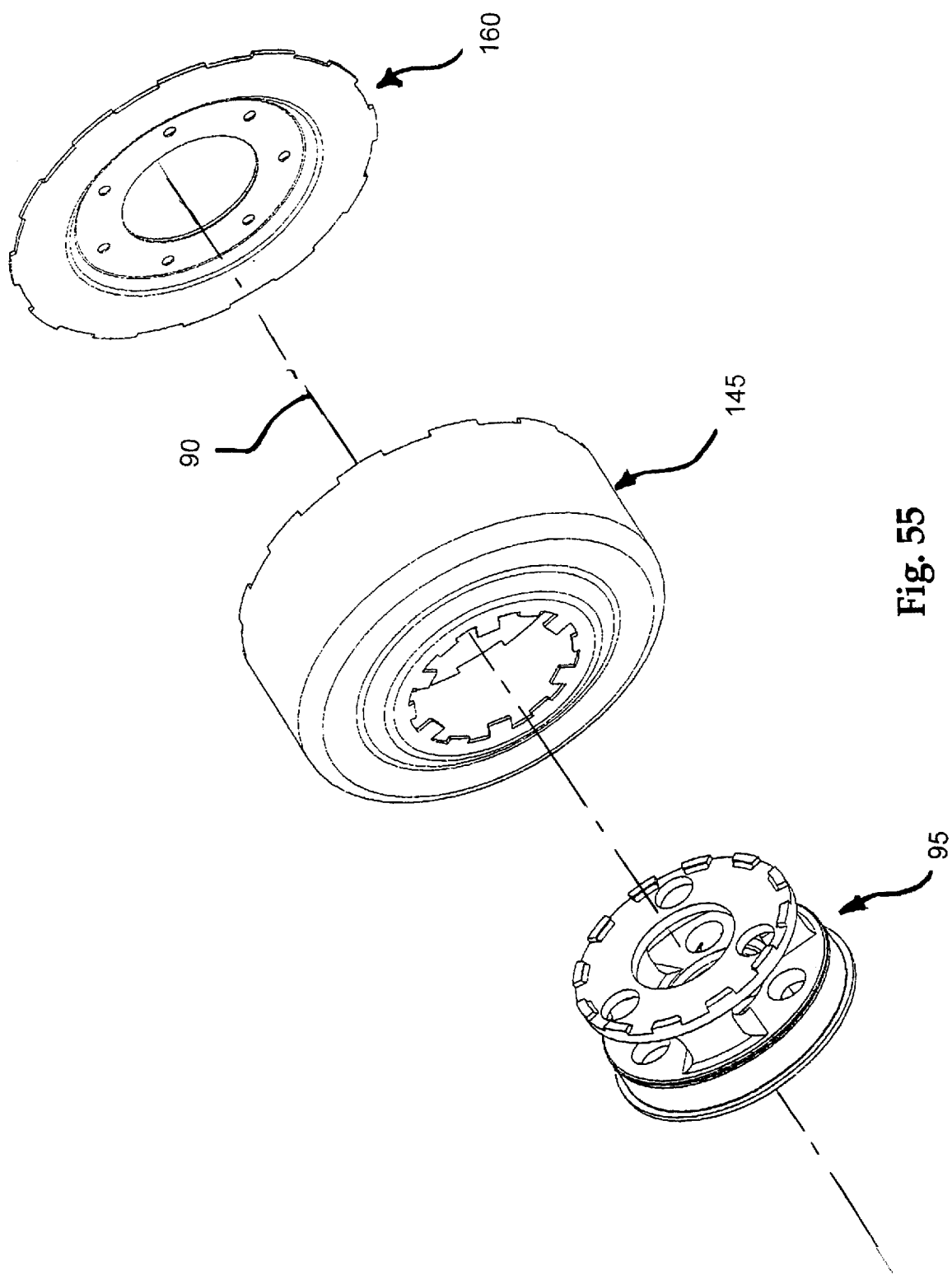
FIG. 55 is an exploded perspective view of the planet carrier, the motor drum, and the motor drive disc shown in FIG. 4, showing the alignment for the cog drive connection between the planet carrier and the motor drum, and showing the alignment for the castellated joint between the motor drum and the motor drive disc.
Figure 56:
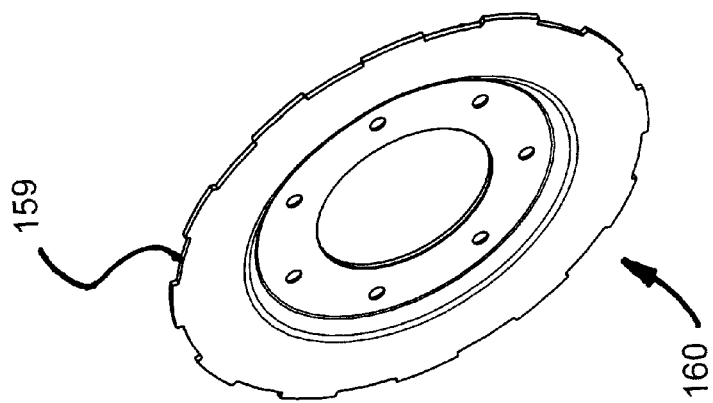
FIG. 56 is a perspective view of the motor drive disc shown in FIG. 55.
Figure 57:
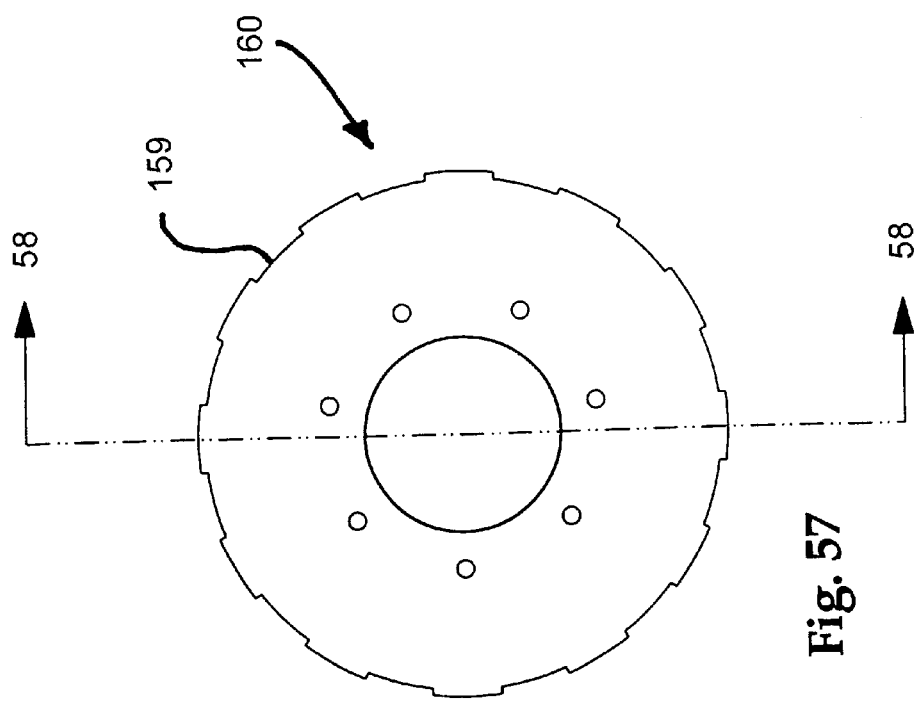
FIG. 57 is an eld elevation of the motor drive disc shown in FIG. 56.
Figure 58:
FIG. 58 is a sectional side.elevation of the motor drive disc along lines 58—58 in FIG. 57.

A cup-shaped motor drum 145, shown in FIGS. 4 and 5 and shown in detail in FIGS. 52–54, has a cylindrical wall 147 disposed concentrically inside the fixed housing 88, and a radially extending end wall 148. The end wall 148 has anaxial opening 149 having radially extending teeth 150 which fit between and drive cogs 152 on the outer periphery of the inner face of the planet carrier 95, as shown in FIGS. 4 and 23. The engagement of the teeth 150 between the cogs 152 transmits torque generated in the motor 130 to the planet carrier 95 and thence to the output shaft, by way of a spline coupling between splines 154 in the bore of the planet carrier 95 and splines 156 on the output shaft, as shown in FIG. 10. The cylindrical wall 147 of motor drum 145 ends in a castellated free circular edge 158 which is coupled with and driven by a corresponding castellated free edge 159 of a motor drive disc 160, shown in detail in FIGS. 56–58. The motor drive disc 160 is fastened to the outer face of the motor rotor 130 by screws 162, as shown in FIG. 4, so torque generated in the motor rotor 130 is transmitted directly to the motor drum 145 through the castellated joint 158/159, and then to the planet carrier 95 through the cogs 152, as shown in FIG. 55.

Figure 59:
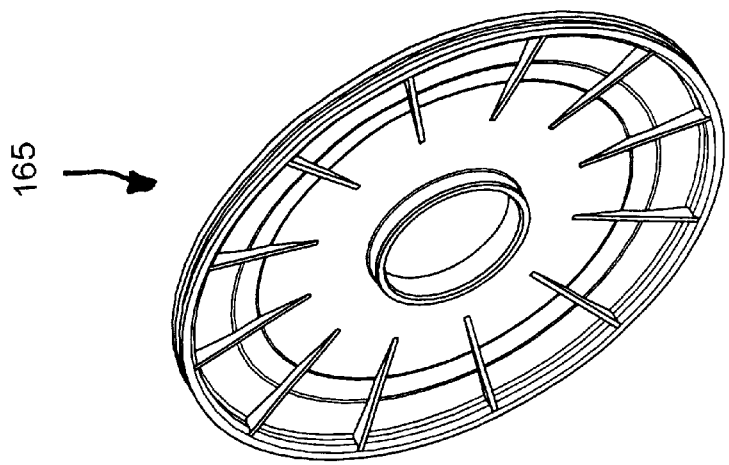
FIG. 59 is a perspective view of the pulley end cap shown in FIG. 4.
Figure 60:
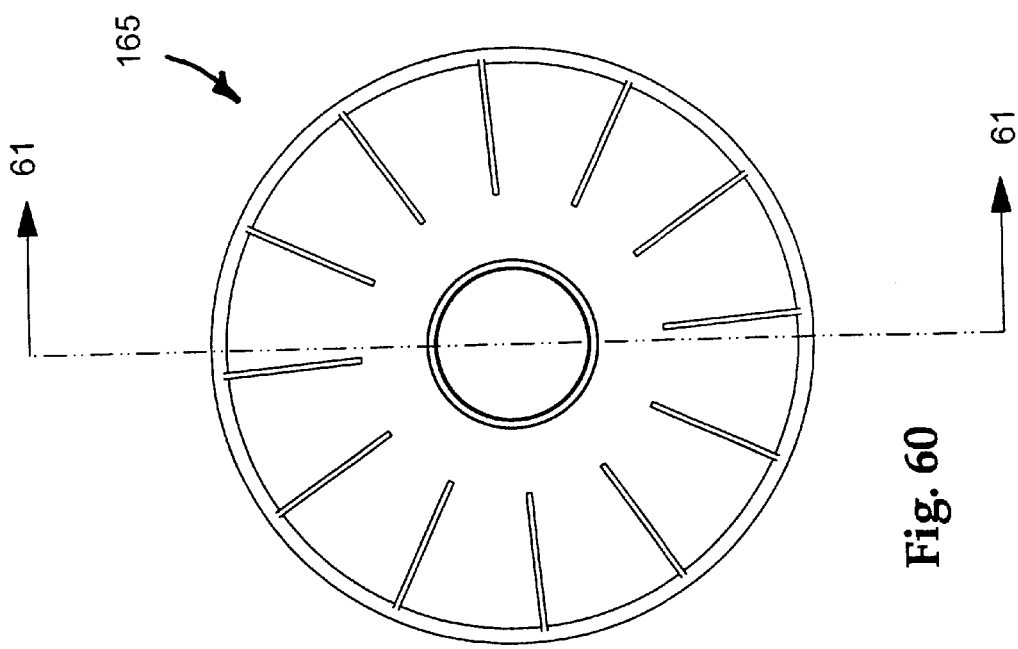
FIG. 60 is an end elevation of the pulley end cap shown in FIG. 59.
Figure 61:
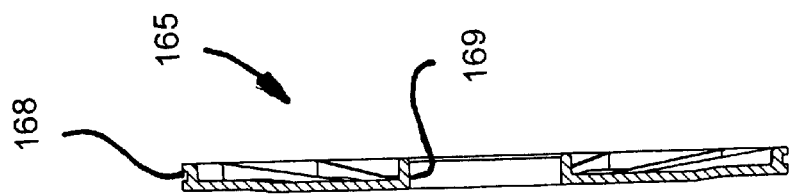
FIG. 61 is a sectional side elevation of the pulley end cap along lines 61—61 in FIG. 60.
Figure 62:
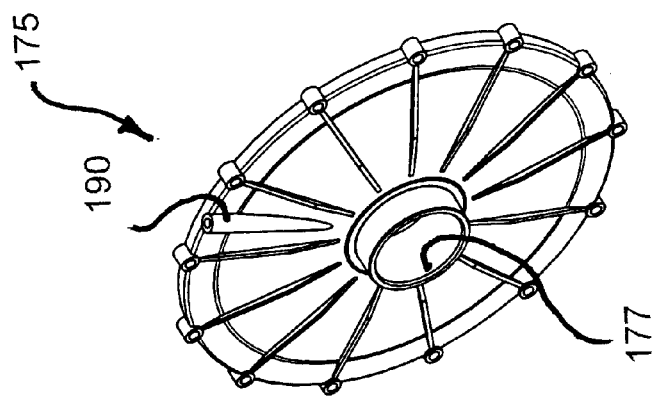
FIG. 62 is a perspective view of the support flange shown in FIG. 4.
Figure 63:
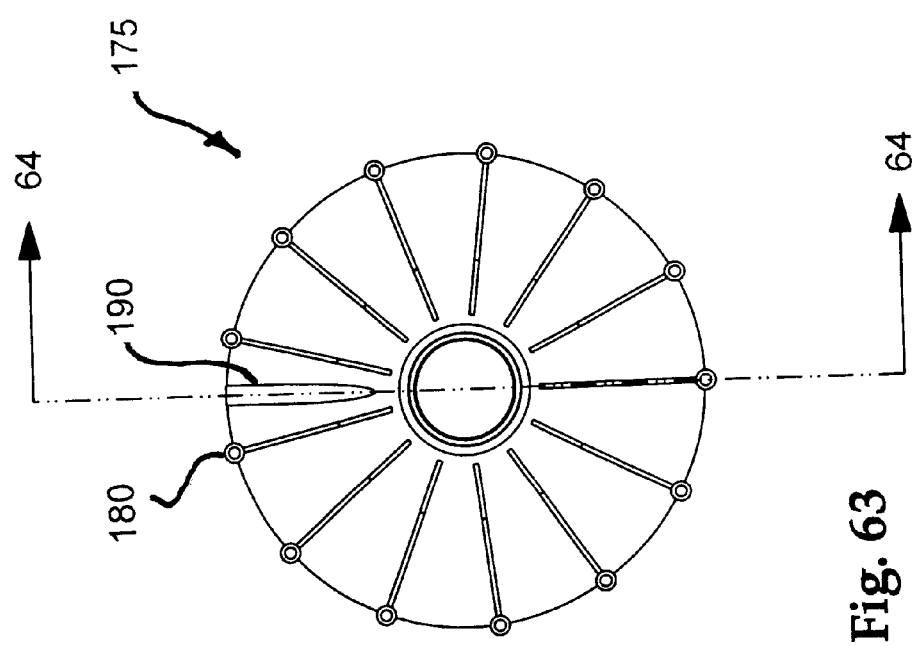
FIG. 63 is an end elevation of the support flange shown in FIG. 62.
Figure 64:
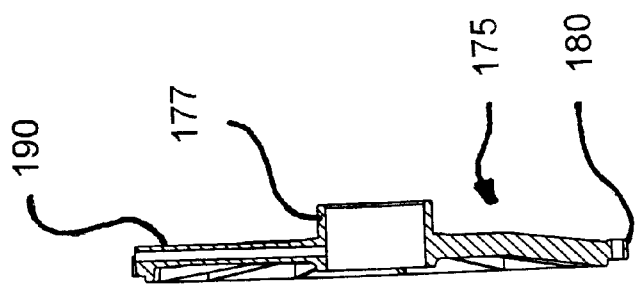
FIG. 64 is a sectional side elevation of the support flange along lines 64—64 in FIG. 63.

At the support end of the transmission 50, the driven pulley 60 is supported by a pulley end cap 165, shown in detail in FIGS. 59–61, that is held in a shallow groove around the inside surface of the driven pulley 60 by a snap ring 167, as shown in FIGS. 4 and 5, or it could be fastened to an inwardly extending flange on the driven pulley by machine screws. The outer edge of the pulley end cap 165 has an outwardly opening groove 168 for receiving a seal ring (not shown) such as a conventional elastomeric static seal ring, and the inner edge 169 is supported on a needle bearing 170. At the support end of the transmission 50, the fixed housing 88 is supported on a support flange 175, shown in detail in FIGS. 62–64. The support flange 175 includes an inner ferrule 177 mounted in a fixed position on a cylindrical mount 179 of the support plinth 53 between the square base plate 68 and the stub shaft 140, against rotation relative to the cylindrical mount 179. The radially outer edge of the support flange 175 is provided with a number of integral bushings 180 which receive machine screws 182 that are threaded into tapped holes in bosses 184 in the free edge of the cylindrical wall 186 of the housing 88 to connect the support flonge 175 rigidly to the housing 88.

A pitot tube 190 is formed as an elongated radially extending boss on the outside face having a tube bore communicating between the inside of the inner ferrule 177 and the outside edge of the support flange 175. The pitot tube 190 is used to drain excess lubricating oil and oil leakage from the pump and motor out of the case of the transmission, as discussed in detail below.

Figure 65:
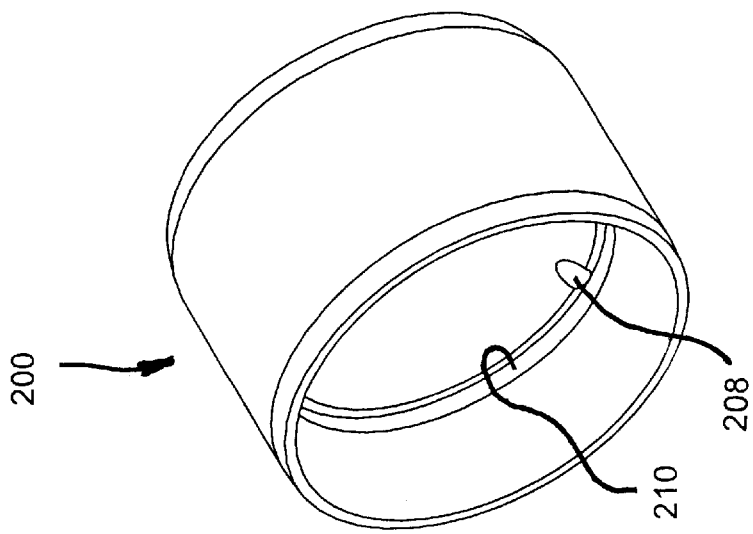
FIG. 65 is a perspective view of the one of the pistons shown in FIG. 4.
Figure 66:
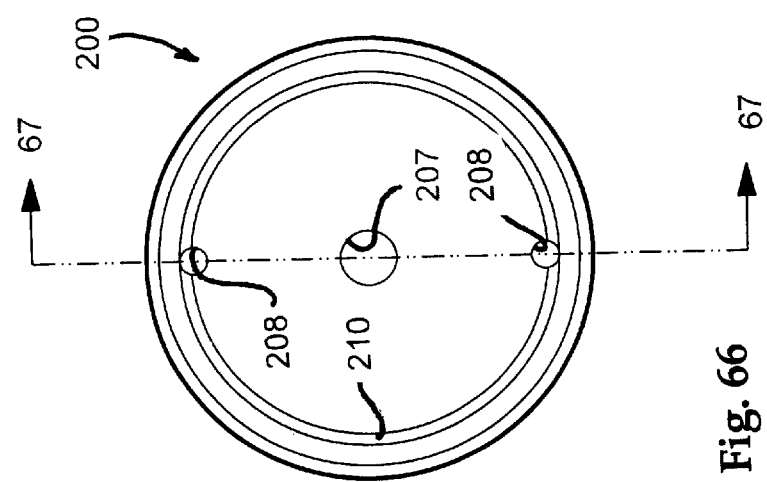
FIG. 66 is an end view of the piston shown in FIG. 65.
Figure 67:
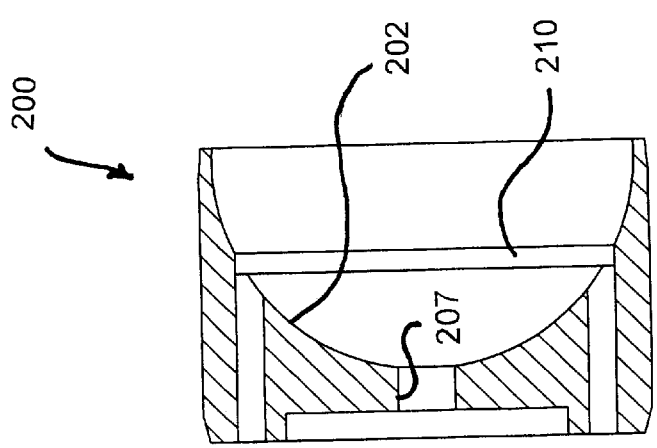
FIG. 67 is a sectional side view of the piston along lines 67—67 in FIG. 66.

Referring now to FIGS. 38–42, the pump includes the pump rotor 125 which has a number of radial pump cylinders 195, each having a radially inner opening 197 communicating with the bore 127 of the pump rotor 125. In this embodiment, there are 7 pump cylinders. A pump piston 200, shown in FIGS. 4 and 5 and shown in detail in FIGS. 65–67 is fitted into each pump cylinder 195. Each piston 200 has a cylindrical outside surface that fits snuggly into its pump rotor cylinder 195, and has a semi-spherical outer face, forming a pocket 202 that receives a ball 205. The balls 205 are intended to rotate in the pockets 202, floated in an oil film that is pressurized by the system pressure created by reciprocation of the pistons in the cylinders. The system pressure is communicated through the piston between the inside face of the piston and the ball/pocket interface by way of a central axial hole 207 and two side holes connected by a circular groove 210. The pistons are made of bronze, although other conventional materials and even high-strength plastics could be used. The sealing of the pistons in the cylinders could be improved, at a greater cost, by the use of piston rings.

Figure 68:
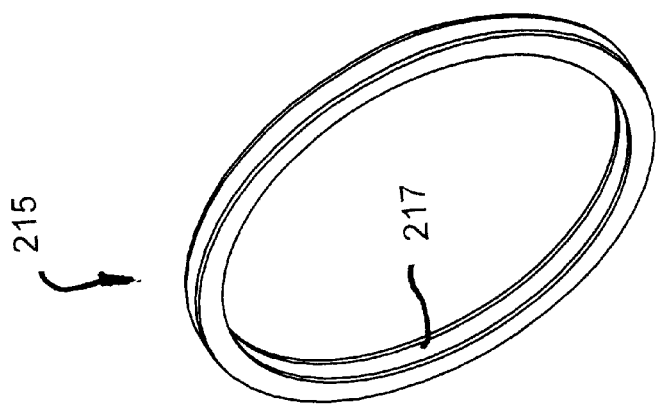
FIG. 68 is a perspective view of one of the two cam races shown in FIG. 4.
Figure 69:
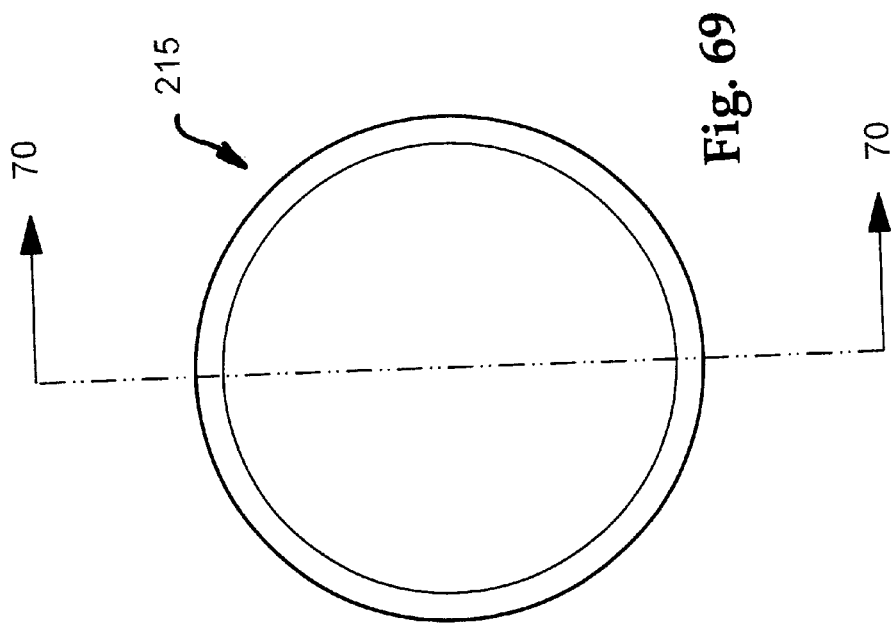
FIG. 69 is a end elevation of the cam race shown in FIG. 68.
Figure 70:
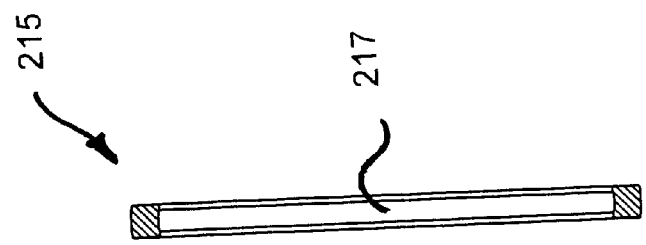
FIG. 70 is a sectional side elevation of the cam race along lines 70—70 in FIG. 69.
Figure 71:
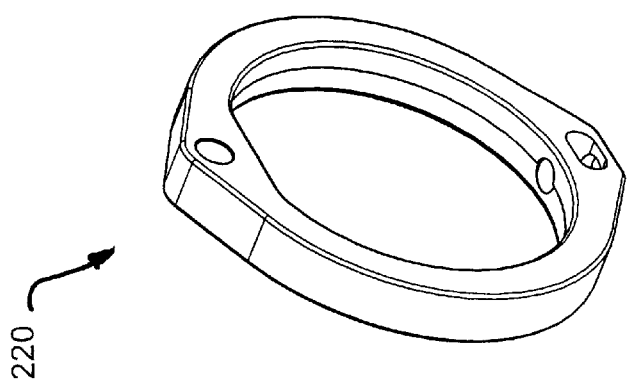
FIG. 71 is a perspective view of the pump cam ring shown in FIGS. 4 and 43.
Figure 72:
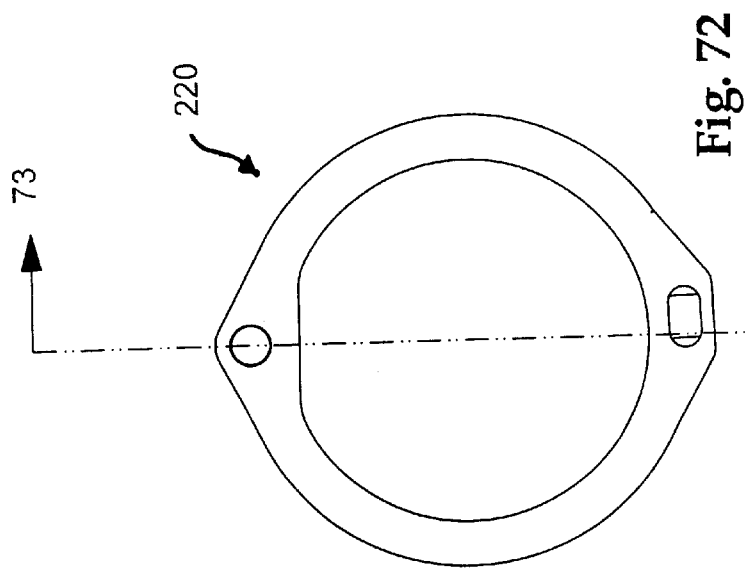
FIG. 72 is an end elevation of the pump cam ring shown in FIG. 72.
Figure 73:
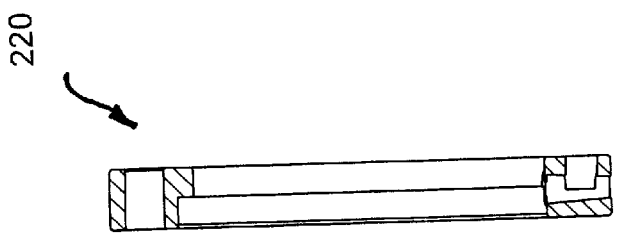
FIG. 73 is a sectional side elevation of the pump cam ring along lines 73—73 in FIG. 72.

Reciprocation of the pump pistons 260 is effected by rotating the pump rotor 125 with the balls 205 of the pistons engaged with a hardened cam race 215, shown in FIGS. 68–70, mounted in a pump cam ring 220, shown in FIGS. 71–73. The cam race 215 has a concave inside surface 217 that is shaped to match the surface of the balls 205, thereby mining the contact pressure of the balls 205 on the cam race 215. The pump cam ring 220 is mounted on the pintle 130, as shown in FIGS. 4–7 and 43, in a position surrounding the pump rotor 125, with the cam race 215 aligned radially over the balls 205.

Figure 74:
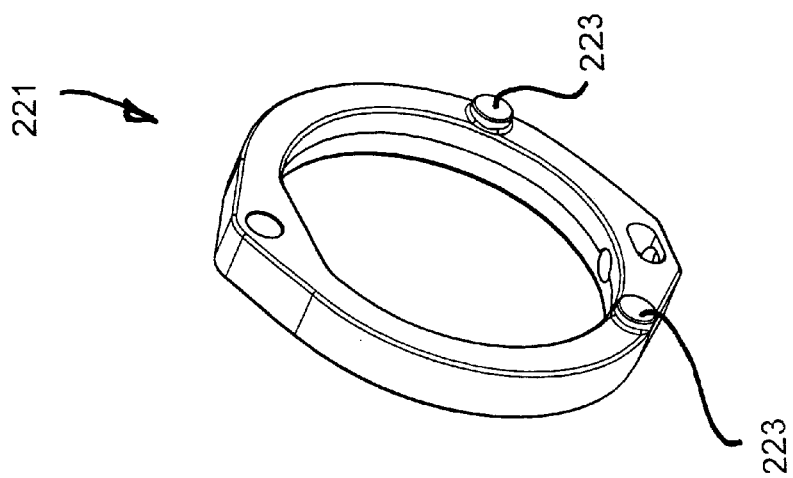
FIG. 74 is a perspective view of the motor cam ring shown in FIGS. 4 and 43.
Figure 75:
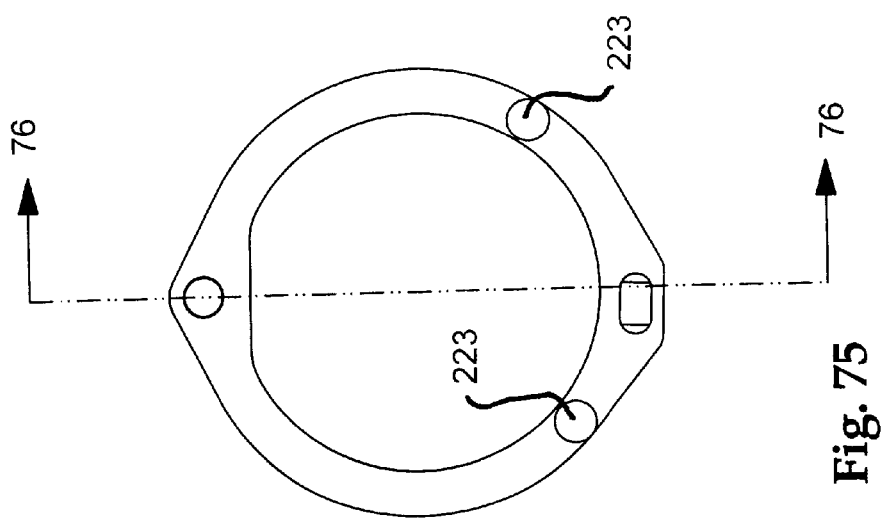
FIG. 75 is an end elevation of the motor cam ring shown in FIG. 74.
Figure 76:
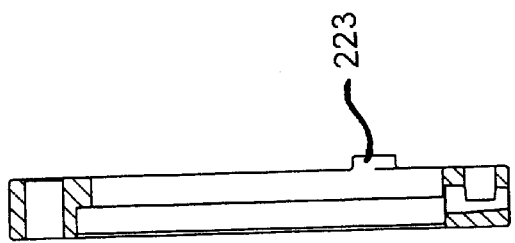
FIG. 76 is a sectional side elevation of the motor cam ring along lines 76—76 in FIG. 75.

The motor, also shown in FIGS. 4 and 5, is structurally similar to the pump. It includes the motor rotor 130, motor pistons 201 and motor piston balls 206 inside a motor cam race 216, all identical to the corresponding parts in the pump. The motor cam race 216 is mounted in a motor cam ring 221, shown in FIGS. 74–76, which is a mirror image of the pump cam ring, and also includes two attachment bosses 223 which receive pivot pins by which push blocks 225 are pivotally attached to the motor cam ring 221. The push blocks 225 are engaged by control pistons to control the transmission ratio, as described in greater detail below.

Figure 77:
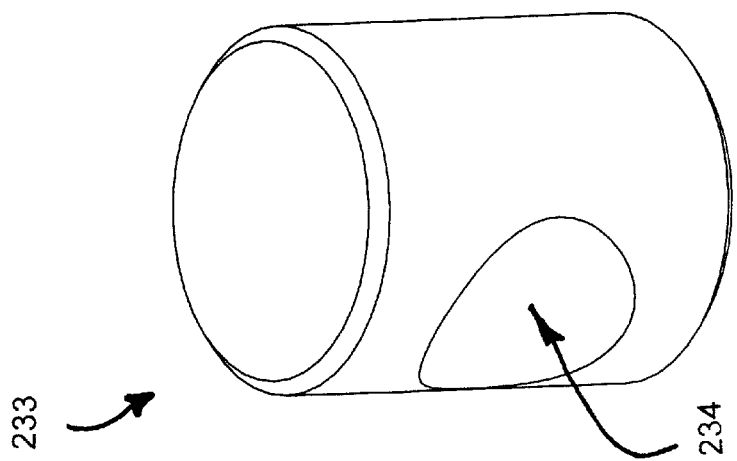
FIG. 77 is a perspective view of one of the two cylindrical joint plugs shown in the top of the am rings in FIGS. 4 and 43.
Figure 78:
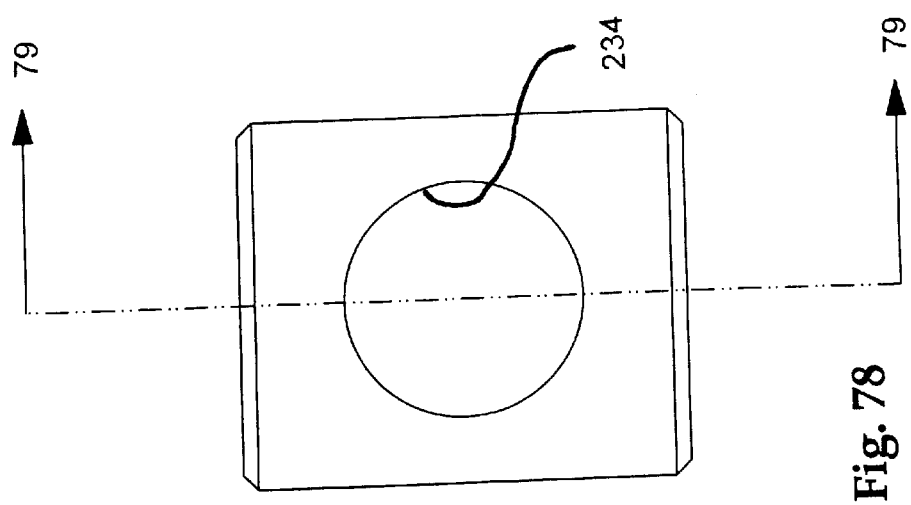
FIG. 78 is an end elevation of the cylindrical joint plug shown in FIG. 77.
Figure 79:
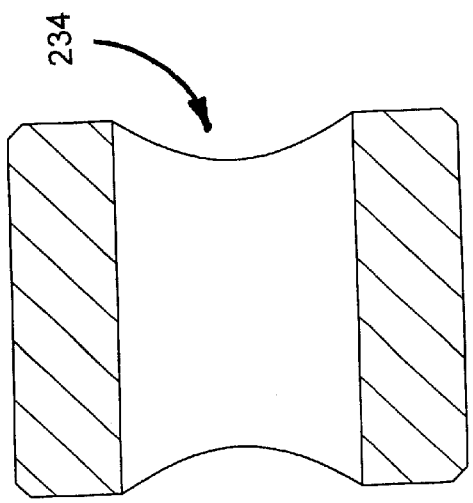
FIG. 79 is a sectional side elevation of the joint plug along lines 79—79 in FIG. 78.

As shown in FIGS. 4, 6–9 and 43, the cam rings 220 and 221 are pivotally supported on the pintle 130 by way of a pivot pin 228 that is mounted in a bore 230 in the pintle 130 on an axis parallel to and below the stepped bore 138. Effectively, the cam rings 220 and 221 are mounted on a stationary pivot pin in the transmission 50. The top end of each of the cam rings 220 and 221 has a cylindrical joint plug 233, shown in FIGS. 77–79, fitted into a cylindrical recess opening in the top of the cam ring 220 and 221. The cylindrical joint plugs 233 each have a diametrical hole 234 drilled through the cylindrical join plug, each of which receives one of two opposite ends of a cylindrical lever rod 235. The lever rod 235 is mounted at its longitudinal center in a center cylindrical joint plug 237 that is mounted for rotation about its vertical axis in a cylindrical recess 238 in the top of the pintle 130. Each side of the pintle 130 on either side of the cylindrical recess 238 has an elongated opening 239 that is tapered to allow the cylindrical lever rod 235 to swivel about the vertical axis of the center cylindrical joint plug 237 in the opening 239 when the cam rings are rotated in opposite directions about the pivot pin 228 by the control pistons, as described below. Since the pump and motor cam rings are pivotally supported about the pintle by means of the pivot pin 228 and the opposite ends of the cam rings 220 and 221 are connected to each other via the swiveling lever rod 235 thru the sliding and pivoting joints 233 which is pivotally supported on the pintle at the center cylindrical joint plug 237, so as one cam ring is moved, the other cam ring is forced to move in the opposite direction.

Figure 6:
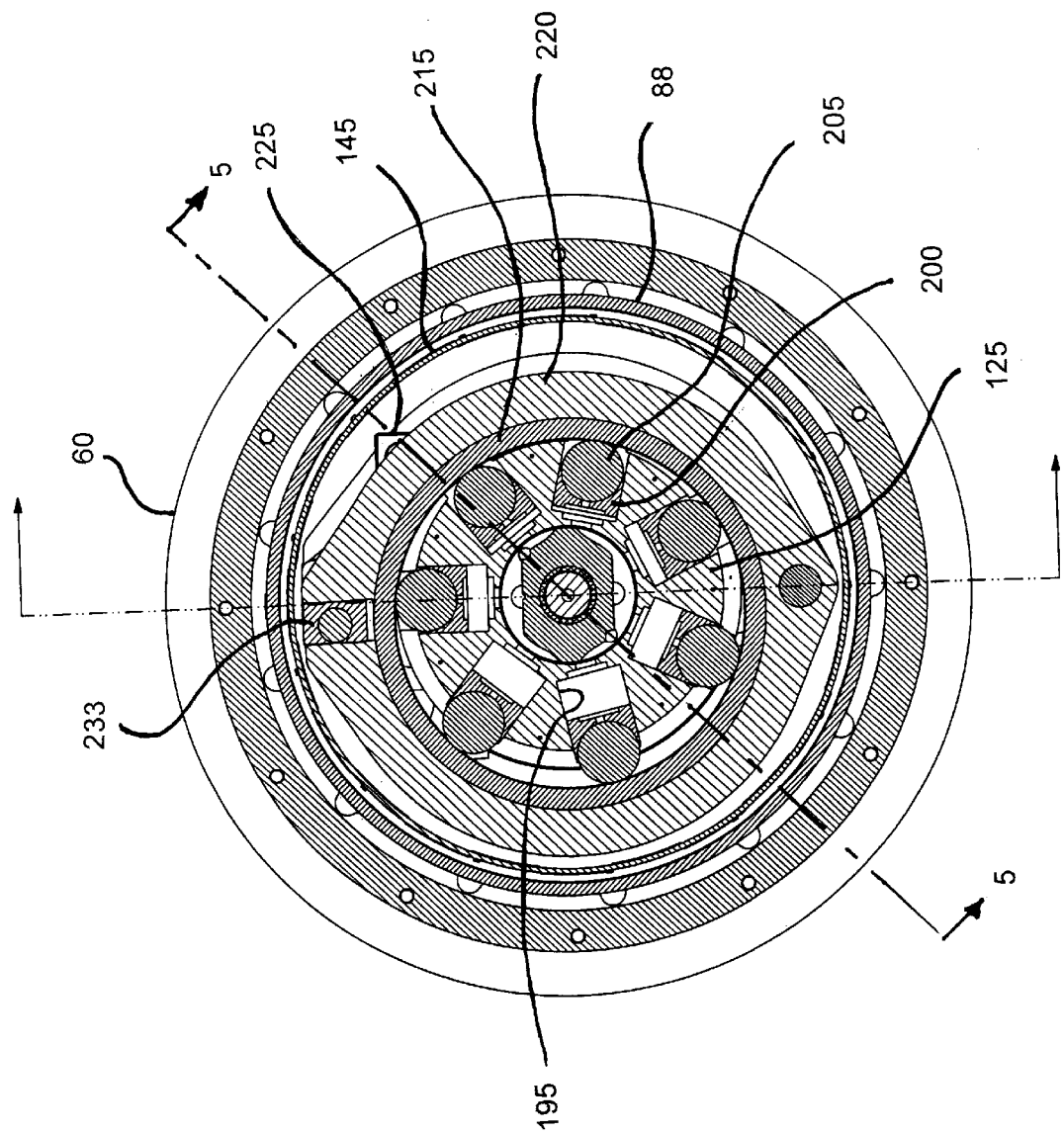
FIGS. 6 and 7 are sectional elevations along lines 6/7—6/7 in FIG. 4, at two different settings of the transmission, respectively.
Figure 7:
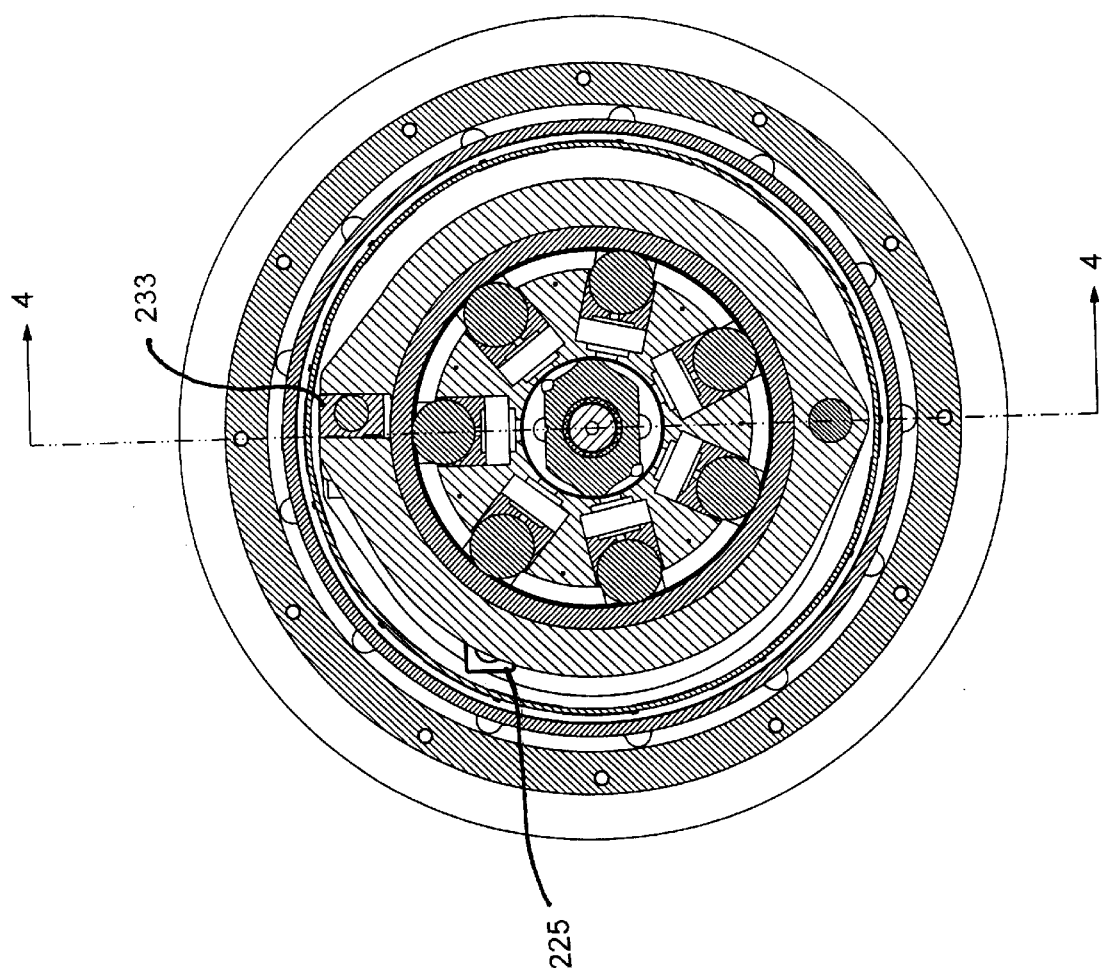
Figure 8:
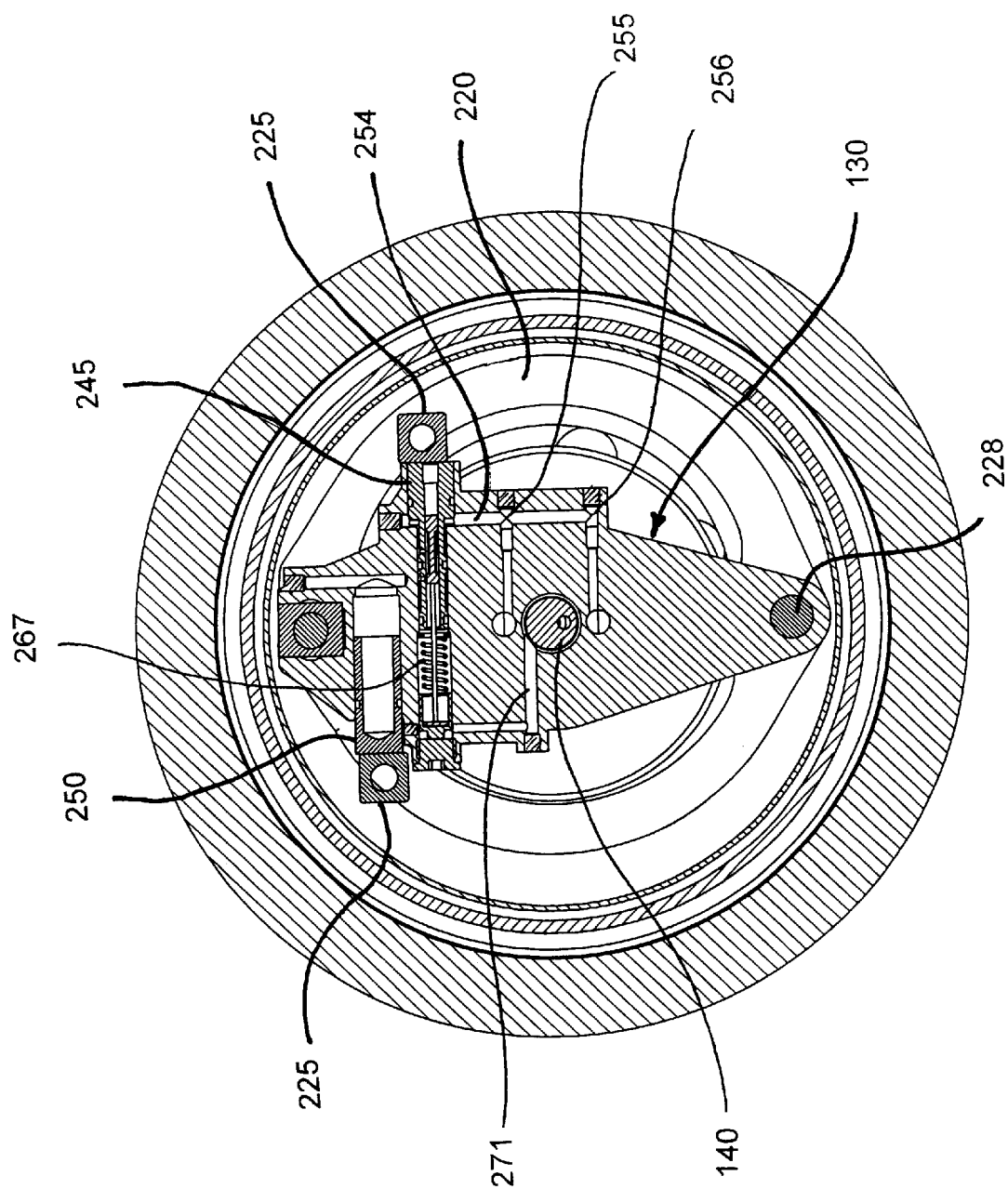
FIGS. 8 and 9 are sectional elevations along lines 8/9—8/9 in FIG. 4, at the two different settings of the transmission, respectively, shown in FIGS. 6 and 7.
Figure 9:
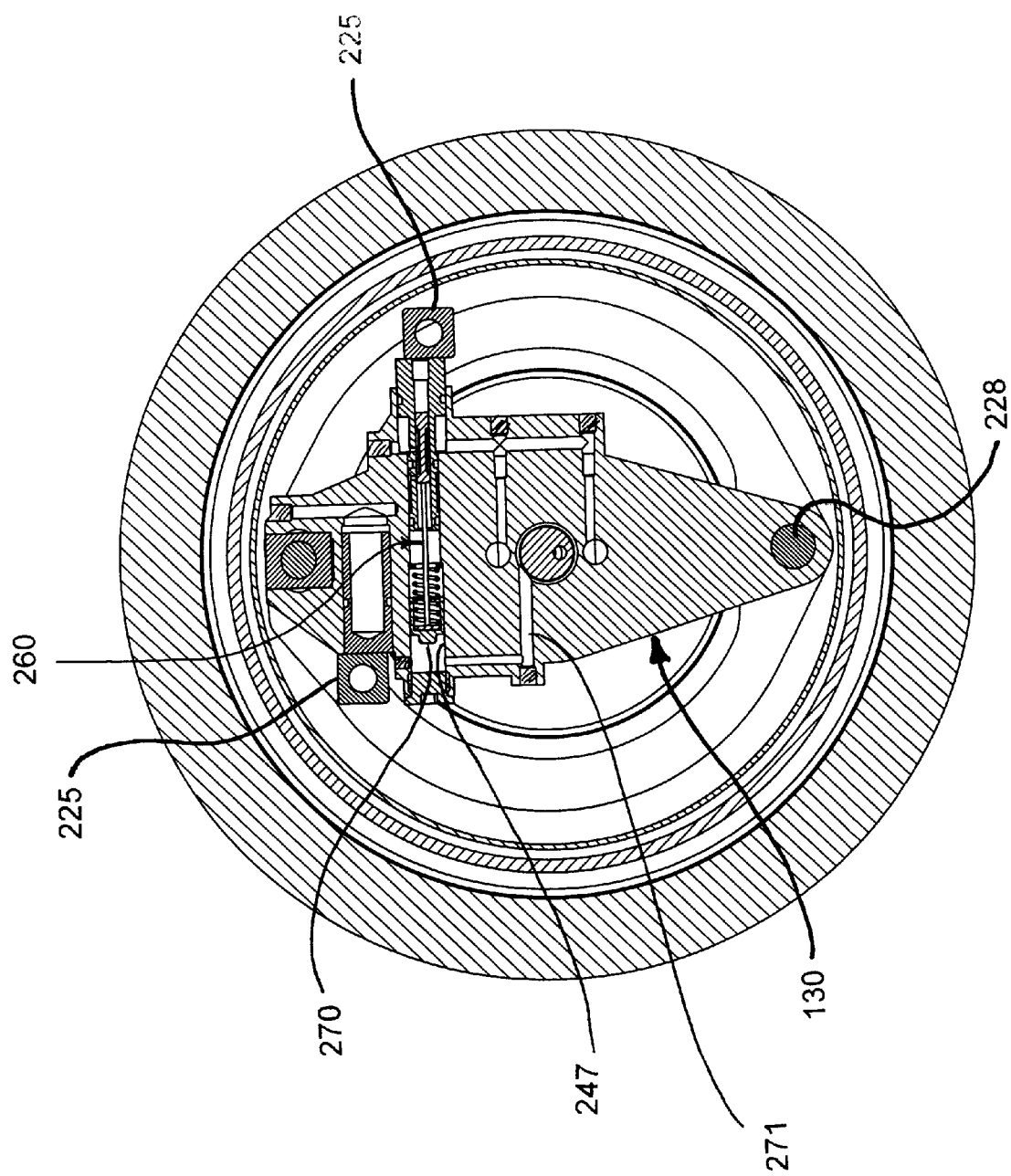
Figure 81:
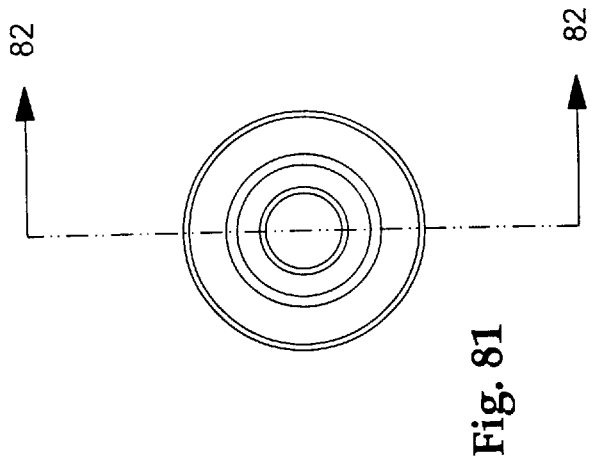
FIG. 81 is an end view of the control piston shown in FIG. 80.
Figure 80:
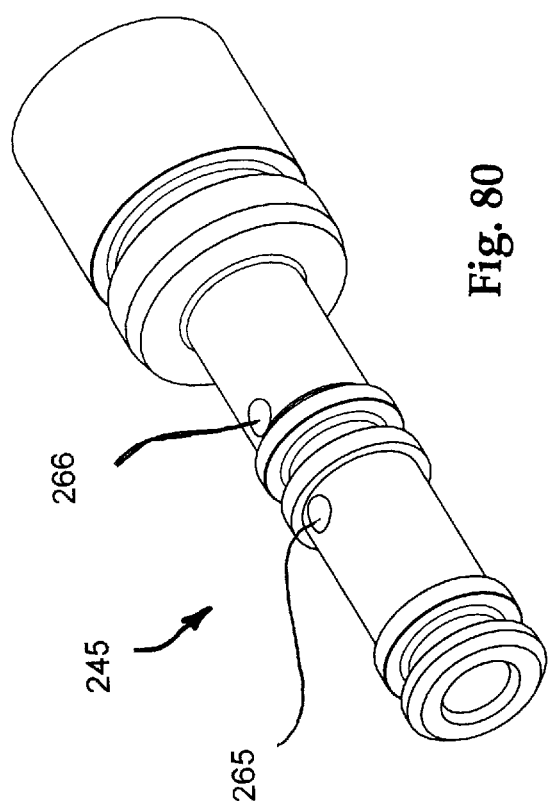
FIG. 80 is a perspective view of the control piston shown in FIGS. 8 and 9.
Figure 82:
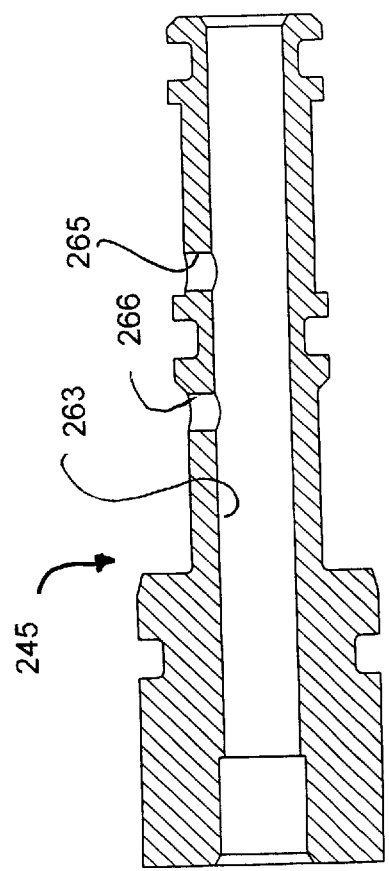
FIG. 82 is a sectional view of the control piston along lines 82—82 in FIG. 81.
Figure 84:
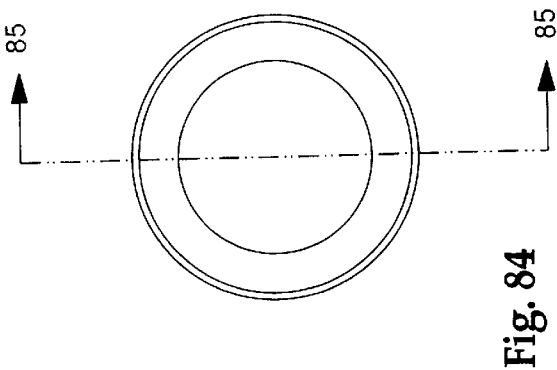
FIG. 84 is an end view of the open end of the load piston shown in FIG. 83.
Figure 83:
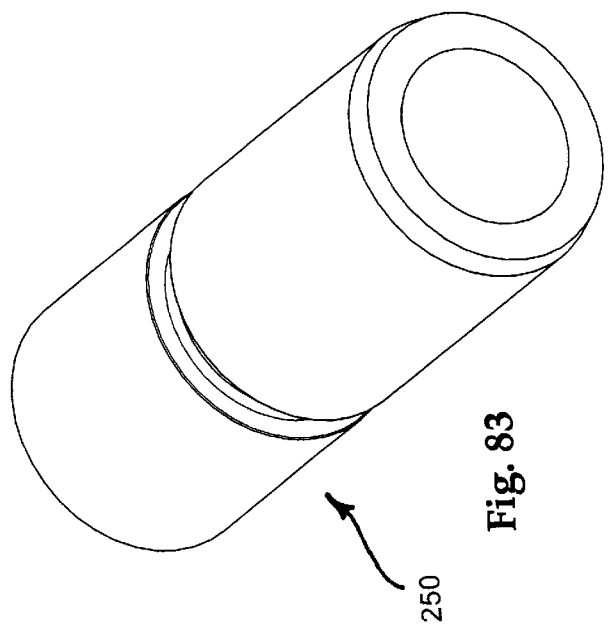
FIG. 83 is a perspective view of the load piston shown in FIGS. 8 and 9.
Figure 85:
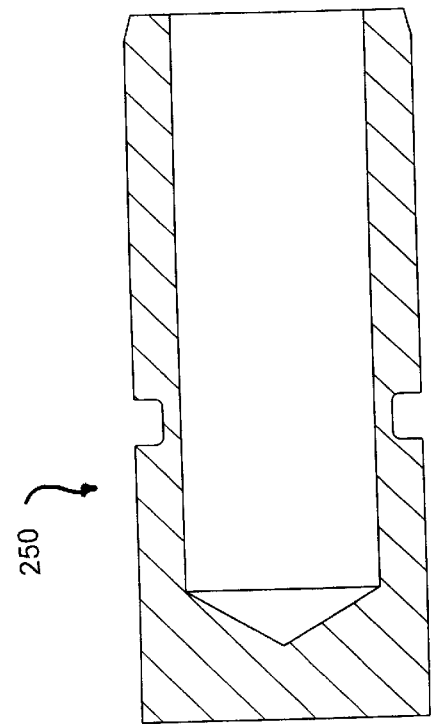
FIG. 85 is a sectional view of the load piston along lines 85—85 in FIG. 84.
Figure 88:
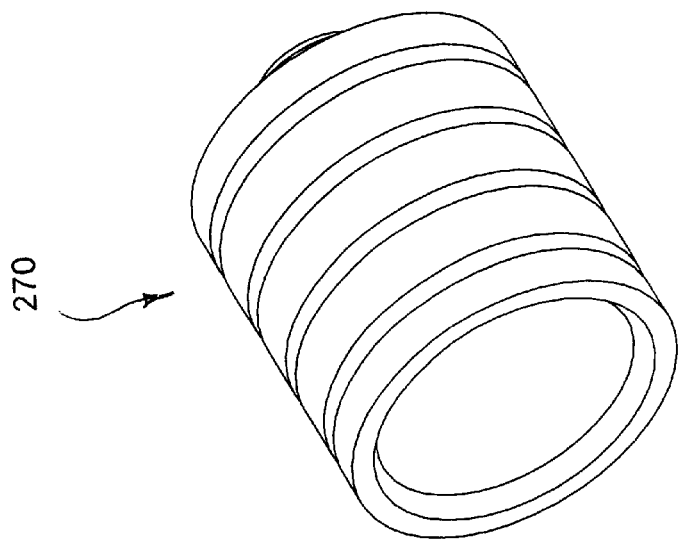
FIG. 88 is a perspective view of spool piston shown in FIGS. 8 and 9.
Figure 89:
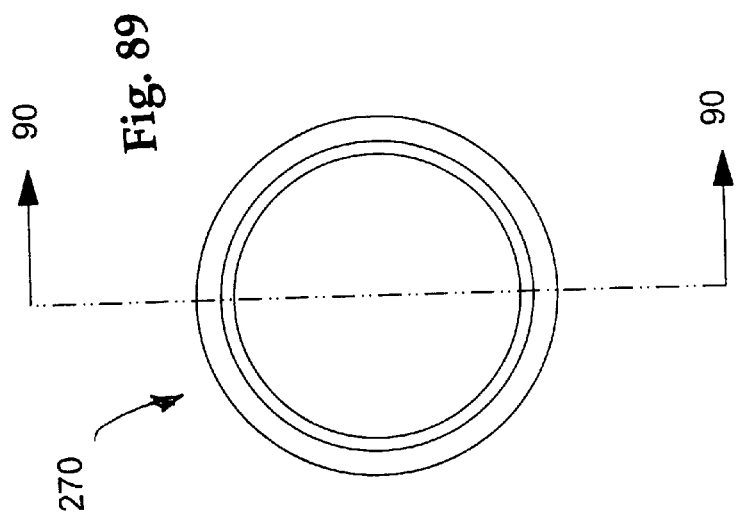
FIG. 89 is an end view of the open end of the spool piston shown in FIG. 88.
Figure 90:
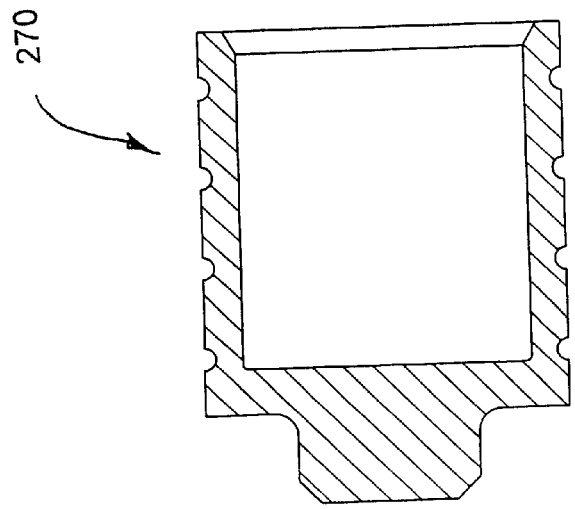
FIG. 90 is a sectional view of the spool piston along lines 90—90 in FIG. 89.
Figure 91:
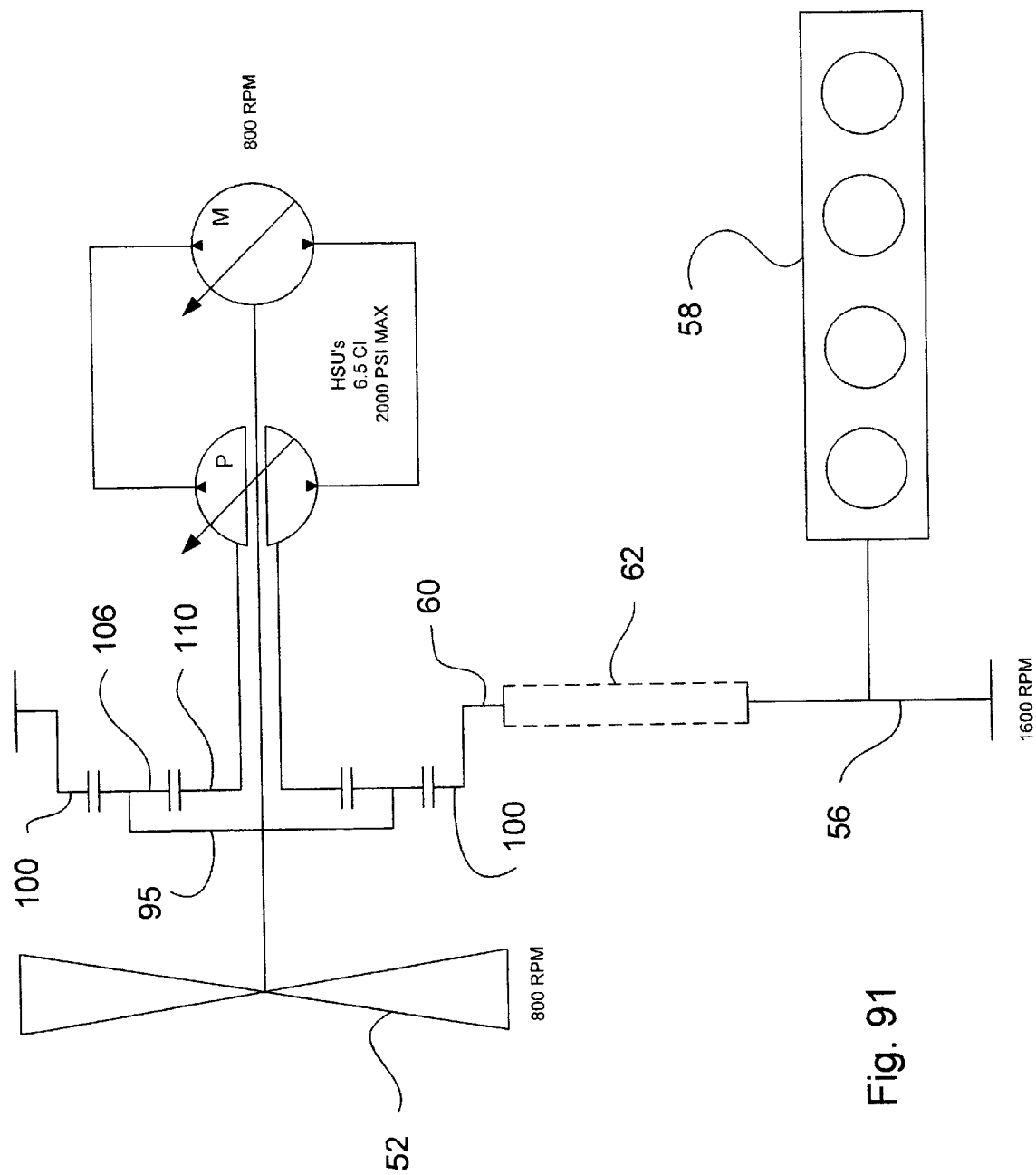
FIG. 91 is a schematic diagram of the transmission shown in FIG. 4 and the drive arrangement for the transmission shown in FIG. 1.

The angular tilt of the cam rings 220 and 221 about the pivot pin 228 between the two extreme positions shown in FIGS. 6 and 7 is controlled by the control system shown in FIGS. 8 and 9. Because one cam ring is forced to follow the other cam ring, only one cam ring need be controlled, in this case, the motor cam ring 221. Tilt control of the motor cam ring 221 is achieved by means of two separate pistons housed in cylinders the pintle 130, a control piston 245, shown in detail in FIGS. 80–82, in a stepped cylinder 247 shown in FIG. 50, and a load piston 250, shown in detail in FIGS. 83–85 in a cylinder 252. These pistons act upon the push blocks 225 that are pivotatly connected to opposite sides of the motor cam ring 221 on the attachment bosses 223. The control piston 245 is continually fed with system pressure through a fluid channel 254 via two check valves 255 and 256 and strokes the motor cam ring 221 toward its maximum displacement. The load piston 250 is fed with a modulated pressure, via a control spool 260, shown in detail in FIGS. 86 and 87, disposed in an axial bore 263 in the control piston 245, and strokes the motor cam ring 221 toward zero displacement. The load piston 250 has a larger area than that of the control piston 245, so that it can overcome both the control forces on the cam ring and the control force from the control piston 245.

System pressure is tapped off from the pintle 130 via the two check valves 255 and 256 and is fed continually to the control cylinder 247 to act against the annular area of the control piston 245. System pressure is fed from the fluid channel 254 through openings 265 and 266 in the control piston 245 into the bore 263 of the control piston to act on the .control spool 260 that sits inside of the control piston 245. The control spool 260 modulates the system pressure that is fed to the load piston 250. The porting to the control spool 260 is such that when the control spool 260 is moved to the right, relative to the control piston 245, system pressure is fed directly into the load piston chamber. When system pressure acts upon the load piston 250, the load piston generates enough force to overcome both the control forces on the cam ring and the control force from the control piston and hence strokes the cam ring toward zero displacement. This has the effect of moving the control piston 245 to the right relative to the control spool 260 and thereby closing of the port feeding system pressure to the load piston 250. When the control spool is moved to the left relative to the control piston, pressure acting upon the load piston is vented. Therefore the force that the load piston generates fall to zero, and as system pressure is continually fed to the control piston, the control piston strokes the motor cam ring toward maximum displacement. This causes the control piston to move to the left relative to the control spool, and thereby closes the port venting the load piston chamber.

Looking at FIGS. 8 and 9, a bias spring 267 is compressed between the inside face 268 of an end disc 269 on the control spool 260 and a shoulder in the control cylinder 247. The spring force of the spring 267 acts to move the control spool toward the left (i.e. stroke the transmission toward final ratio). Control pressure is admitted to the control cylinder through passages 271 and acts upon a spool piston 270 engaged with the control spool 260 to move the control spool to the right when there is sufficient control pressure acting upon the spool piston to overcome the spring force. As the control spool is moved further to the left the spring is further compressed and hence the spring force increases, thereby requiring a higher control pressure to overcome this force. Therefore by modulating the control pressure, the control spool can be accurately positioned relative to the control piston and hence control the position of the motor and pump cam ring, thus controlling the ratio of the transmission. In the design presented, control pressure is supplied and modulated by an external source and fed into the pintle, via a fitting (not shown) in a port 272 in the base of the support plinth 68, and on into the spool piston chamber. Alternatively, the position of the control spool could be controlled by a miniature stepper motor or servo motor in the pintle, controlled by wires extending through the axis of the stub shaft 140 or by wireless telemetry.

Rotation of the pump rotor 125 around the inside of the pump cam ring 235 in contact with the cam race 215 when the pump cam ring 220 is tilted to a non-concentric position with respect to the pump rotor 125, as shown in FIG. 6, causes the balls 205 to drive the pistons 200 radially into the cylinders and displace fluid which is pumped out radially into fluid channels that run axially between the motor rotor and the pump rotor. As the pump rotor is rotated against the half of the cam race that drives the pump cylinders into the pump rotor cylinders, fluid in those cylinders is pressurized and pumped out through the high pressure passages in the pintle arbor to the motor rotor cylinders, causing the motor pistons to move forcefully under fluid pressure radially outward against the cam race of the motor cam ring and exert a torque on the motor rotor that is transmitted via the motor drive disc and the motor drum to the planet carrier and thence to the output shaft.

As the motor pistons pass the top-dead-center position, they are driven back into their cylinders radially and displace spent fluid through, the low pressure fluid passages in the pintle arbor to the pump pistons. The low pressure fluid flow fills the pump cylinders in preparation for their next pressure stroke.

The transmission shown in FIGS. 2–9 and described above is designed to be used in applications where an underdrive final ratio is required, and where the input centerline to the output centerline is offset from the transmission centerline, as when power is transmitted by means of a belt, chain, gear train, etc. The described example is a demand fan drive for a large vehicle radiator cooling fan. This design is shown at Neutral. The input hydrostatic unit (HSU) or pump, is at zero displacement and the output HSU, or motor, is at maximum displacement. Both HSUs are simultaneously controlled in this case, although they can be independently controlled.

In operation, the input from the engine 58 drives the input pulley 56. This pulley 56 drives the driven pulley 60 which is the input to the transmission. The driven pulley 60 is connected to the ring gear 100 of the planet set (Rp). The sun gear 110 of the planet set (Sp). drives the pump rotor 125 about the axis 90. The planet carrier 95 of the planet set is connected to the output shaft 66 (Sg1), and is connected to the motor rotor 130 via the motor drum 145.

Make-up pressure is fed externally from a separate source into the support plinth 53 via a fluid passage 274 and two check valves which connect the make-up supply to the high and low pressure lines of the pump and motor rotors 125 and 130. This make-up supply also acts as the lubrication supply for the bearings and gears. Control pressure is also fed into the support plinth through a fluid passage 272, externally from a separate source, and then on into the pintle through the fluid passages 271 where it acts upon the control spool.

When the fan drive is at neutral, the output shaft 66 (and hence the motor and planet carrier 95) is stationary, the ring gear 100 is rotating at input speed and therefore the sun gear 110 (and hence the pump) is rotating at (Sp/rp) multiplied by the driven pulley speed, in the opposite direction to the input, (in the disclosed embodiment, this is [64/23] 2.78 times input speed). If the pump is at zero displacement, there would be no pumping and therefore no reaction torque could be generated at the pump. Hence the pump rotor 125 would rotate freely and allow no output speed. This true neutral would be desirable for some applications of this transmission, such as the drive transmission for small vehicles. However, in one intended use of the disclosed embodiment, wherein the transmission is used as a vehicle radiator cooling fan drive, it is desirable always to keep the fan spinning at some speed for safety reasons. Therefore, in this application, the pump will not be allowed to go fully to zero displacement, thereby keeping the fan drive at some ratio above neutral.

The planet set configuration splits the input torque into two parallel paths: 1) a direct mechanical path fed continually to the output shaft 66 at the ratio of input torque multiplied by (1+(Sp/Rp)) in the same direction, and 2) a mechanical path fed continually to the pump at the ratio of input torque multiplied by (Sp/Rp) in the opposite direction.

As the pump cam ring 220 is stroked to give the pump a small displacement and it is rotating at input speed multiplied by (Rp/Sp), pumping takes place. This fluid flow passes directly through the pintle 130 to the motor rotor 135 and drives the motor (in the opposite direction to the pump) to give output speed. Due to the fact that the pump is at a small displacement, a small amount of torque to the pump results in a high pressure and small flow rate. The motor is at a large displacement, so the high pressure and small flow rate of the pump results in a high output torque and low output speed. This high 'hydraulic' output torque is added directly to the mechanical output torque as described above. Therefore the total output torque can be expressed as:

$$\text{Output Torque} = \text{Input Torque} \times [(1+(Sp/Rp)) + ((Rn/Sn) \times \text{motor disp/pump disp})]$$

It can therefore be seen that there is a total output torque comprising of a fixed mechanical torque plus a variable hydraulic torque. As the motor displacement to pump displacement ratio decreases, the amount of hydraulic torque decreases, and if the motor displacement equals zero then there is no hydraulic torque, just mechanical torque.

An advantage of using this kind of hydromechanical transmission in a fan drive application is that when the transmission is at low ratios (where most of the output power is generated hydraulically), the fan speed is slow and hence does not take much power to drive it. This means that very little power will ever get passed through the hydraulic path of the transmission and hence hydraulic losses will be low.

As the pump displacement increases, flow rate from the pump increases, and this increased flow causes the motor and hence the output shaft to increase in speed. As the output shaft increases in speed, the planet carrier increases in speed relative to the put shaft and hence ring gear speed, this causes the sun gear speed to decrease, which causes the pump speed to decrease. This has the effect of reducing the total system flow rate, when compared to a conventional hydrostatic fan drive of the same capacity, to approximately $\frac{1}{3}$ to $\frac{1}{4}$ depending on planet set ratios used. This reduces the flow losses and noise levels normally associated with hydrostatic machines.

As the motor displacement approaches zero and the pump displacement approaches its maximum, the pump speed approaches zero and motor speed approaches its maximum. When the motor reaches zero displacement it can no longer accept fluid flow so the pump can no longer displace fluid and therefore stops rotating. This causes the sun gear (Sp) to stop rotating. The pump is now acting as a reaction unit for the sun gear. In this case all the input torque is now transferred thru' the planet set, via planet carrier to the output shaft, and due to the ratio of the ring gear to sun gear, the output speed is decreased and the output torque increased (in the disclosed embodiment, this is by a factor of 2.78:1). As the pump has been stroked to its full displacement, hydraulic pressure required to react the input torque has been reduced to a minimum, thus reducing hydraulic leakage losses and hydraulic loading of bearings to a minimum.

With the transmission at final ratio, the fan speed is, at its maximum speed and will hence require full input power to drive it. But as all the power is now transferred through the planet set, and the hydraulics are acting only as a reaction unit to hold the sun gear, the efficiency will be very high (95+%). The only losses being the normal gearset losses (approx. 2%), slippage on the pump due to leakage and windage losses on the motor, due to the fact it is spinning at output speed with the unit at some pressure. To further increase the efficiency at this point a brake could be applied to the pump. This will help in two ways: first it will stop the input unit from slipping due to hydraulic leakage and second it will reduce the hydraulic system pressure to makeup pressure therefore reducing the load and hence windage loss of the motor. The brake could be actuated by makeup pressure or by electro-mechanical means.

Due to the fact that the pump and motor rotate in the opposite directions, the control system is designed to tilt the cam rings such that they are stroked in opposite directions when making adjustments to the transmission ratio, so as to keep the flow passages and the pressure fields inline. When the fan drive is viewed from the front, the pump cam ring is rotated to the left, (from zero displacement to maximum), as the motor cam ring is rotated to the right, (from maximum to minimum displacement), as the CVT is stroked from neutral to final ratio.

Make-up fluid is fed externally from a separate source via a port 273 in lower edge of the base of the support plinth and a passage 274 through the stub shaft 140, then through two check valves in the pintle arbor to the high and low pressure fluid passages in the arbor. Make-up pressure is also fed into the output shaft whereby it is directed to the various gears and bearings for lubrication.

Lubrication oil and oil that leaks from the pump and motor rotors will fall to the sump of the transmission, which in this design is the inside diameter of the driven pulley 60. As the driven pulley is rotating at some ratio of engine speed, the oil that collects there will be centrifuged out to the inside diameter of the driven pulley. This oil is collected and returned to its external source through the pitot tube 190 and a passage 275 to a port 278 in the top of the plinth base 68. A small elbow may be attached to the outer end of the pitot tube 190 with an angled opening facing into direction of the rotating oil layer on the inside of the driven pulley 60, and close to inside diameter of the driven pulley 66, to collect the oil before it reaches the level of the house 88. As oil rotates at driven pulley speed and comes into contact with the pitot tube, the dynamic head of the oil gets converted into pressure head, and pumps itself down the tube into the outlet port in the fan drive support, or it merely flows down the pitot tube 190 by gravity. This ensures that this sump oil will not be churned by the rotating pulley 60.

This invention provides numerous advantages and benefits as well as a plethora of additional possibilities, including the following:

Low power is throughput at low transmission ratio when hydraulics do most of the work. This reduces the hydraulic losses normally incurred in hydrostatic devices.

When clipping fan speed, no power is wasted.

With the gear train, a range of final ratio speed ranges is possible, as contrasted with 1:1 with a clutch.

No particulates are generated in the lube oil due to clutch wear because the clutch is eliminated.

Improved life and efficiency.

Lower fan noise due to the ability to keep the fan at an optimum speed at all operating conditions.

Due to the fact that the hydraulics do little work, low cost hydrostatic units can be used.

The transmission uses the same inputs (i.e lube and control supply) as current clutch type fan drives, making integration and retrofitting easy.

Balls in spherical pockets enhance piston sealing in the cylinders.

The piston/ball interface is hydrostatically balanced by means of a pressure fed balance groove to reduce the contact loading between the ball and the piston ensuring ball rotation in the pockets and reducing friction between the ball and the piston.

By stroking the cam rings in the opposite directions and rotating them in opposite directions the rotating high pressure fields are kept in line with each other between the pump and motor. This places the control shaft in shear and the pintle in tension, not in bending, thereby reducing the stress and deflections in those parts.

All of the hydraulic forces and control forces are contained within the pintle and hydrostatic unit assembly, and are not transferred to the support or housing, thereby reducing noise transmitted to the outside. Only reaction torque is transmitted to the support.

Obviously, numerous modifications and variations of the preferred embodiment described above are possible and will become apparent to those skilled in the art in light of this specification. For example, vane-type hydrostatic units could be used instead of the radial piston type hydrostatic units in situations where greater power density is required and the disadvantages of shorter life and greater leakage rate of vant-type hydrostatic units would be acceptable. Moreover, many functions and advantages are described for the preferred embodiment, but in many uses of the invention, not all of these functions and advantages would be needed. Therefore, we contemplate the use of the invention using fewer than the complete set of noted features, process steps, benefits, functions and advantages. Moreover, several species and embodiments of the invention are disclosed herein, but not all are specifically claimed, although all are covered by generic claims. Nevertheless, it is our intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, in all their combinations, are to be considered within the spirit and scope of the invention as defined in the following claims, wherein.

We claim:

1. A continuously variable hydromechanical power transmission, comprising:
   - a fixed support plinth at a support end for mounting said transmission to a fixed support structure;
   - an output shaft at an output end for connection to a driven device;
   - a pintle having a flat radial slab and an axial arbor bolted to said plinth;
   - a radial piston pump rotor rotatably mounted on one end of said arbor and a radial piston motor rotor mounted on an opposite end of said arbor;
   - cylindrical cam rings mounted around said pump and motor rotors and engaging piston balls in said pump and motor rotor cylinders for pumping and torque generation;
   - a driven pulley, having a drive surface engaged with a driving element for coupling rotating mechanical power to said transmission, said driven pulley surrounding said pump and motor and constituting an exterior shell within which working fluid is contained;
   - a planetary gear set having a ring gear coupled to said driven pulley, and a sun gear coupled to said pump rotor for transmitting torque from said driven pulley to said pump rotor;
   - said planetary gear set having a planet carrier with planet gears engaged between the ring gear and a sun gear, said planet carrier being coupled to said motor rotor and to said output shaft for transmitting motor torque and reaction torque from said pump to said output shaft.

2. The transmission as defined in claim 1, further comprising:
   - a pivot pin extending through a radially outer portion of said pintle and both of said cam rings for adjustably mounting said cam rings at desired radial positions relative to said pump and motor rotors.

3. The transmission as defined in claim 2, further comprising:
   - a control system having a control piston having actuator pistons mounted in said pintle slab and bearing against at least one of said cam rings for adjusting said radial positions of said cam rings.

4. The transmission as defined in claim 2, further comprising:
   - a lever rod mounted for swiveling in a radial outside portion of said pintle slab and engaged in a swivel mount in each of said cam rings opposite said pivot pin; whereby, tilting of one ring in one direction causes said lever rod to swivel about its swivel mounting in said pintle and tilt the other pump cam ring in the opposite direction.

5. A process for transmitting rotary mechanical power from an input prime mover to an output device at a continuously variable transmission ratio, comprising:
   - driving a ring gear of a planetary gear set with torque applied from a prime mover;
   - driving planet gears, which are engaged between said ring gear and a sun gear, with said ring gear;
   - driving said sun gear with said planet gears;
   - driving a pump rotor with said sun gear;
   - pressurizing a working fluid by rotation of said pump rotor, and conveying said pressurized working fluid to a motor, and generating motor torque in said motor with said pressurized working fluid;
   - applying reaction torque from torque applied to said pump rotor directly to an output shaft, and summing said reaction torque with said motor torque in said output shaft to produce output torque in said output shaft.

* * * * *